United States Patent
Yang

(10) Patent No.: US 8,820,033 B2
(45) Date of Patent: Sep. 2, 2014

(54) STEEL AND WOOD COMPOSITE STRUCTURE WITH METAL JACKET WOOD STUDS AND RODS

(71) Applicant: WeiHong Yang, Sunnyvale, CA (US)

(72) Inventor: WeiHong Yang, Sunnyvale, CA (US)

( * ) Notice: Subject to any disclaimer, the term of this patent is extended or adjusted under 35 U.S.C. 154(b) by 0 days.

(21) Appl. No.: 13/887,353

(22) Filed: May 5, 2013

(65) Prior Publication Data

US 2013/0239512 A1    Sep. 19, 2013

Related U.S. Application Data

(63) Continuation-in-part of application No. 13/243,909, filed on Sep. 23, 2011, now abandoned, which is a continuation-in-part of application No. 12/804,601, filed on Mar. 19, 2010, now abandoned.

(51) Int. Cl.
| | |
|---|---|
| *E04C 3/292* | (2006.01) |
| *B32B 15/10* | (2006.01) |
| *E04C 3/16* | (2006.01) |
| *E04B 5/14* | (2006.01) |
| *E04C 3/36* | (2006.01) |
| *E04B 1/30* | (2006.01) |
| *E04C 3/17* | (2006.01) |
| *E04B 1/26* | (2006.01) |
| *E04H 12/00* | (2006.01) |

(52) U.S. Cl.
CPC ............... *E04C 3/292* (2013.01); *E04B 1/2608* (2013.01); *E04B 1/2612* (2013.01); *E04C 3/16* (2013.01); *B32B 15/10* (2013.01); *E04B 5/14* (2013.01); *E04C 3/36* (2013.01); *E04B 1/30* (2013.01); *E04H 12/00* (2013.01); *E04B 2001/266* (2013.01); *Y02B 10/30* (2013.01); *E04C 3/17* (2013.01); *Y10S 52/06* (2013.01)
USPC ...... 52/834; 52/223.8; 52/745.19; 52/DIG. 6; 29/428; 29/897.3; 29/897.34

(58) Field of Classification Search
CPC ............. B32B 15/10; E04B 1/30; E04B 5/14; E04B 1/2608; E04B 1/2612; E04B 2001/266; E04C 3/10; E04C 3/16; E04C 3/17; E04C 3/29; E04C 3/292; E04C 3/36; E04C 5/08; E04H 12/00; Y02B 10/30
USPC .............. 52/834, 835, 838, 842, 847, DIG. 6, 52/223.1, 223.4, 223.8, 741.3, 745.19, 52/841, 844; 29/428, 897.3, 897.34
See application file for complete search history.

(56) References Cited

U.S. PATENT DOCUMENTS 96,793 A * 11/1869 Gatling ........................... 52/376
1,453,996 A * 5/1923 Riddle ............................ 52/376
(Continued)

FOREIGN PATENT DOCUMENTS

| | | | |
|---|---|---|---|
| CN | 1840836 A | * | 10/2006 |
| DE | 1552045 A1 | * | 4/1970 |

(Continued)

OTHER PUBLICATIONS

Machine Translation of JP 2007-146617 A retrieved from the JPO on Aug. 20, 2013 (2 pages).*

*Primary Examiner* — Basil Katcheves
*Assistant Examiner* — Rodney Mintz
(74) *Attorney, Agent, or Firm* — Law Office of Dorian Cartwright

(57) ABSTRACT

A composite member provides support to a structure. A wooden core of the composite member has a perimeter and a length. The wooden core provides support to the structure. A metal jacket is tightly wrapped to an optimum circumferential pre-stress around the entire perimeter of the wooden core of the composite member and spans the entire length. The metal jacket provides also support to the structure. Furthermore, the interaction between the wooden core and the metal jacket provide a combination of strength that surpasses the sum of individual strengths.

12 Claims, 17 Drawing Sheets

(56) References Cited

U.S. PATENT DOCUMENTS

| | | | |
|---|---|---|---|
| 1,615,815 A * | 1/1927 | Birdsey | 156/348 |
| 2,039,398 A * | 5/1936 | Dye | 52/847 |
| 2,099,470 A * | 11/1937 | Coddington | 52/376 |
| 2,126,622 A | 8/1938 | Davis | |
| 2,167,835 A * | 8/1939 | Greulich | 52/376 |
| 2,167,836 A * | 8/1939 | Greulich | 52/376 |
| 2,187,280 A * | 1/1940 | Olson | 52/376 |
| 2,200,159 A | 5/1940 | Davis | |
| 2,387,432 A * | 10/1945 | Du Laney | 52/376 |
| 2,918,150 A | 12/1959 | Blum | |
| 3,294,608 A | 12/1966 | Peterson | |
| 3,349,537 A * | 10/1967 | Hopfeld | 52/842 |
| 3,385,015 A | 5/1968 | Hadley | 52/223.8 |
| 3,531,901 A * | 10/1970 | Will, Jr. et al. | 52/309.14 |
| 3,531,903 A * | 10/1970 | Swanson | 52/841 |
| 3,605,360 A | 9/1971 | Lindal | |
| 3,728,837 A * | 4/1973 | Kiefer, Jr. | 52/844 |
| 3,866,884 A | 2/1975 | Heil et al. | |
| 3,913,290 A * | 10/1975 | Billing et al. | 52/347 |
| 4,001,993 A | 1/1977 | Daniels | |
| 4,098,109 A * | 7/1978 | Cailloux | 72/389.5 |
| 4,281,497 A | 8/1981 | Luotonen et al. | |
| 4,430,373 A | 2/1984 | Hammarberg | 428/113 |
| 4,446,668 A * | 5/1984 | Christ-Janer | 52/836 |
| 4,501,102 A | 2/1985 | Knowles | |
| 4,586,550 A | 5/1986 | Kitipornchai | |
| 4,615,163 A | 10/1986 | Curtis et al. | |
| 4,738,071 A | 4/1988 | Ezard | |
| 5,308,675 A * | 5/1994 | Crane et al. | 428/120 |
| 5,497,595 A | 3/1996 | Kalinin | |
| 5,511,355 A * | 4/1996 | Dingler | 52/842 |
| 5,533,309 A | 7/1996 | Rivin | |
| 5,580,648 A * | 12/1996 | Castle et al. | 442/21 |
| 5,617,685 A * | 4/1997 | Meier et al. | 52/223.8 |
| 5,617,697 A | 4/1997 | Erwin | |
| 5,713,169 A * | 2/1998 | Meier et al. | 52/223.13 |
| 5,809,735 A | 9/1998 | LeBlanc | |
| 5,832,691 A * | 11/1998 | Callahan et al. | 52/481.1 |
| 5,875,604 A * | 3/1999 | Rudd | 52/481.1 |
| 5,875,605 A * | 3/1999 | Rudd | 52/847 |
| 5,899,239 A * | 5/1999 | Coulis | 138/163 |
| 6,050,047 A * | 4/2000 | Covelli et al. | 52/847 |
| 6,061,995 A * | 5/2000 | Menchetti et al. | 52/794.1 |
| 6,105,321 A * | 8/2000 | KarisAllen et al. | 52/223.8 |
| 6,134,859 A * | 10/2000 | Rudd | 52/483.1 |
| 6,167,675 B1 | 1/2001 | LeBlanc | |
| 6,250,042 B1 * | 6/2001 | Rudd | 52/841 |
| 6,260,328 B1 | 7/2001 | Fowler et al. | |
| 6,332,301 B1 * | 12/2001 | Goldzak | 52/838 |
| 6,343,453 B1 * | 2/2002 | Wright | 52/841 |
| 6,412,247 B1 * | 7/2002 | Menchetti et al. | 52/847 |
| 6,412,248 B1 * | 7/2002 | Rudd | 52/847 |
| 6,457,292 B1 | 10/2002 | Vrana | |
| 6,505,454 B2 * | 1/2003 | Dingler | 52/842 |
| 6,516,584 B1 | 2/2003 | Rudd | |
| 6,519,911 B1 * | 2/2003 | Sawada | 52/842 |
| 6,594,964 B2 * | 7/2003 | Charland | 52/302.1 |
| 6,729,607 B2 | 5/2004 | Alberson et al. | |
| 6,749,709 B1 | 6/2004 | Krishnawswamy et al. | |
| 6,886,296 B1 | 5/2005 | John et al. | |
| 6,895,723 B2 * | 5/2005 | Knokey et al. | 52/841 |
| 6,902,150 B2 | 6/2005 | Alberson et al. | |
| 6,938,392 B2 | 9/2005 | Fouad et al. | |
| 6,986,205 B2 | 1/2006 | Vrana | |
| 6,993,883 B2 * | 2/2006 | Belanger | 52/847 |
| 7,168,220 B2 * | 1/2007 | Owoc et al. | 52/844 |
| 7,464,512 B1 * | 12/2008 | Perina | 52/651.01 |
| 7,543,369 B2 | 6/2009 | Burkett | |
| 8,161,712 B2 * | 4/2012 | Mackenzie | 52/844 |
| 8,225,580 B2 * | 7/2012 | Peneder | 52/841 |
| 8,266,856 B2 * | 9/2012 | Carlson et al. | 52/309.16 |
| 8,322,037 B2 * | 12/2012 | Carlson et al. | 29/897.3 |
| 8,329,272 B2 | 12/2012 | Cesternino | |
| 8,438,808 B2 * | 5/2013 | Carlson et al. | 52/309.16 |
| 8,468,774 B2 * | 6/2013 | Garry | 52/840 |
| 8,511,043 B2 * | 8/2013 | Fyfe | 52/834 |
| 8,555,601 B2 * | 10/2013 | Brunner | 52/837 |
| 8,621,797 B2 * | 1/2014 | Kim et al. | 52/223.8 |
| 8,650,820 B2 * | 2/2014 | Bocquet et al. | 52/223.8 |
| 2001/0048101 A1 | 12/2001 | Bligh et al. | |
| 2002/0024043 A1 | 2/2002 | Albritton | |
| 2002/0026762 A1 * | 3/2002 | Charland | 52/309.13 |
| 2002/0073641 A1 | 6/2002 | Menchetti et al. | |
| 2002/0088967 A1 | 7/2002 | Lewis et al. | |
| 2002/0112428 A1 * | 8/2002 | Dingler | 52/309.16 |
| 2002/0144484 A1 * | 10/2002 | Vrana | 52/729.5 |
| 2002/0158241 A1 | 10/2002 | Ochoa | |
| 2002/0166306 A1 * | 11/2002 | Wilson | 52/729.1 |
| 2003/0194931 A1 * | 10/2003 | Crigler | 442/101 |
| 2004/0040253 A1 * | 3/2004 | Knokey et al. | 52/729.4 |
| 2004/0226254 A1 * | 11/2004 | Charlwood | 52/720.1 |
| 2005/0166530 A1 * | 8/2005 | Wilson | 52/729.1 |
| 2005/0252165 A1 * | 11/2005 | Hubbell et al. | 52/745.19 |
| 2006/0070339 A1 * | 4/2006 | Peneder | 52/729.1 |
| 2007/0131918 A1 | 6/2007 | James | |
| 2007/0137137 A1 * | 6/2007 | Peek et al. | 52/729.1 |
| 2007/0175583 A1 * | 8/2007 | Mosallam | 156/307.1 |
| 2007/0256389 A1 * | 11/2007 | Davis | 52/729.4 |
| 2008/0159807 A1 * | 7/2008 | Andrews | 403/363 |
| 2008/0282633 A1 * | 11/2008 | Buckholt | 52/309.8 |
| 2009/0013640 A1 * | 1/2009 | Caroussos | 52/831 |
| 2009/0293405 A1 * | 12/2009 | Andrews et al. | 52/578 |
| 2010/0047489 A1 * | 2/2010 | Cesternino | 428/34.1 |
| 2010/0139181 A1 * | 6/2010 | Cortina-Cordero et al. | 52/125.2 |
| 2010/0207087 A1 | 8/2010 | James | |
| 2011/0167759 A1 * | 7/2011 | Cesternino | 52/834 |
| 2011/0250417 A1 * | 10/2011 | Hubbell et al. | 428/218 |
| 2011/0252743 A1 * | 10/2011 | Yang | 52/849 |
| 2012/0011805 A1 * | 1/2012 | Yang | 52/834 |
| 2012/0141706 A1 * | 6/2012 | Bocquet et al. | 428/35.6 |
| 2012/0298943 A1 | 11/2012 | Yang | |
| 2013/0025222 A1 * | 1/2013 | Mueller | 52/293.3 |
| 2013/0055677 A1 * | 3/2013 | Hayden et al. | 52/835 |
| 2013/0133278 A1 * | 5/2013 | Kim et al. | 52/223.4 |
| 2013/0160398 A1 * | 6/2013 | Yang | 52/841 |
| 2013/0340384 A1 * | 12/2013 | Hayden et al. | 52/835 |
| 2013/0340385 A1 * | 12/2013 | Hayden et al. | 52/835 |
| 2014/0083046 A1 * | 3/2014 | Yang | 52/704 |

FOREIGN PATENT DOCUMENTS

| | | | |
|---|---|---|---|
| DE | 1813338 A1 * | 7/1970 | |
| DE | 102011079934 A1 * | 1/2013 | |
| EP | 115769 A2 * | 8/1984 | |
| EP | 284494 | 9/1988 | |
| FR | 2963819 A1 * | 2/2012 | |
| GB | 1305645 A * | 2/1973 | |
| GB | 1305755 A * | 2/1973 | |
| JP | 11200557 A * | 7/1999 | |
| JP | 2003343037 A * | 12/2003 | |
| JP | 2007146617 A * | 6/2007 | |
| WO | WO 8203647 A1 * | 10/1982 | |
| WO | WO 2006102798 A1 * | 10/2006 | |
| WO | WO 2011/115713 A2 | 9/2011 | |
| WO | WO 2011/115713 A3 | 9/2011 | |
| WO | WO 2012044173 A1 * | 4/2012 | |

* cited by examiner

510

520

1210

1220

STEEL AND WOOD COMPOSITE STRUCTURE WITH METAL JACKET WOOD STUDS AND RODS

CROSS-REFERENCE TO RELATED APPLICATIONS

This application claims the benefit of priority as a continuation-in-part to U.S. patent application Ser. No. 13/243,909, filed on Sep. 23, 2011, entitled STEEL AND WOOD COMPOSITE STRUCTURE WITH METAL JACKET WOOD STUDS AND RODS, by WeiHong Yang, which is a continuation-in-part to U.S. patent application Ser. No. 12/804,601, filed on Mar. 19, 2010, entitled STEEL-WOOD COMPOSITE STRUCTURE USING METAL JACKET WOOD STUDS, by WeiHong Yang, the contents of each being hereby incorporated by reference in their entirety.

BACKGROUND

1. Technical Field

The present invention relates generally, to construction material, and more specifically, to a light-framed structural member composed of a wood core and a light-gauge metal jacket.

2. Prior Art

In light-framed construction, support for structures is conventionally provided by members composed of a single material, predominantly either wood or metal studs. These single-material members are often vulnerable to failure due to characteristics of the material. For examples, while wood is very vulnerable to fire and termite, a metal stud has inherent problems of pre-mature failure due to weak connection and local buckling. Furthermore, use of certain materials can have a negative effect on the environment. For example, inefficient use of timber wastes trees, a valuable natural resource. Also, timber is often treated for use in exterior construction which can add pollutants to the environment. In another example, pressure treated wood produces a large volume of waste water with pollutants.

In heavy duty construction, composite techniques are often used to achieve higher structural performance. A composite structure combines different structural materials together to form a new structure. Since it fully utilizes the potential of individual materials, the advantages of composite structures have been well recognized in the engineering community during the past decades.

However, past composite applications, such as concrete-filled steel tubes and composite floor decks, mostly involve combining steel and concrete in various forms, and are primarily used in commercial buildings and infrastructures. There is practically no composite application in light-framed structures.

SUMMARY

The above-mentioned needs are met by an apparatus, system, method, and method of manufacture for using a composite member for enhanced structural performance in light-framed construction.

A composite member provides support to a structure. In one embodiment, a wooden core of the composite member has a perimeter and a length. The wooden core provides support to the structure. In another embodiment, a metal jacket is tightly wrapped to a calculated magnitude of pre-stressed tension in circumferential direction around the entire perimeter of the wooden core of the composite member and can span the entire length. The metal jacket also provides support to the structure.

Furthermore, the interaction between the wooden core and the metal jacket provide a combination of strength that surpasses the individual strengths. Specifically, while the metal jacket provides lateral confinement for the wooden core to increase the compressive strength and ductility of the core in the compression zone, the wooden core also provides lateral support for the metal jacket to prevent pre-mature local buckling failure of the jacket. Thus, the overall strength and ductility of the new composite member is expected to be much higher than the sum those of wooden core and metal jacket when used alone due to two-way lateral interaction. More specifically, the phrase "two-way lateral interaction" refers: (1) a first lateral interaction is that the core help the outer jacket to gain additional capacity by prevent of delay it pre-mature local buckling failure; (2) a second lateral interaction is that the outer jacket helps inner core to gain additional capacity through the coupling of core dilation and confinement effect.

Advantageously, the composite member provides higher strength and ductility, stronger yet simpler connections, better fire and erosion resistance, higher quality, lighter weight, and is environmental-friendly. The present invention covers the whole structural system, which includes components, their connections, vertical gravity framing systems and lateral seismic/wind systems.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Figure 1:
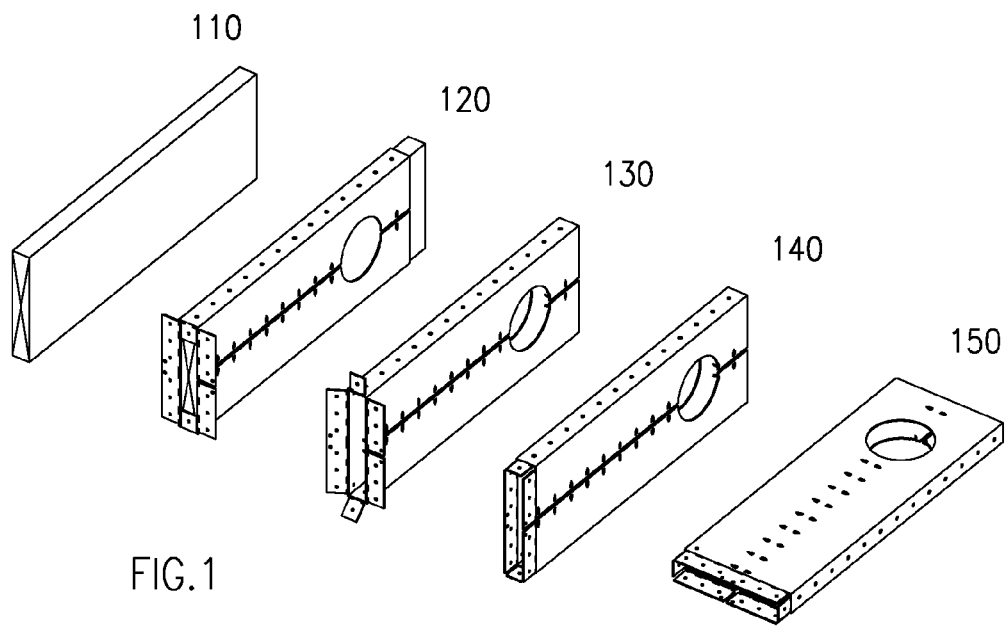
FIG. 1 is a schematic diagram illustrating an example of composite floor joists, according to one embodiment.

An apparatus, system, method, and method of manufacture for using a composite member for enhanced structural performance are described herein. The following detailed description is intended to provide example implementations to one of ordinary skill in the art, and is not intended to limit the invention to the explicit disclosure, as one of ordinary skill in the art will understand that variations can be substituted that are within the scope of the invention as described.

A composite member combines different materials together. Examples of a composite member include, but are not limited to, a joist or beam, post or column, stud or rod, or pole, or other supporting member. The described technique can also be applied to components of a member, connector, rafter, truss, structural system, vertical gravity framing system, lateral seismic or wind system, and the like.

In an embodiment, a steel-wood composite structure using light gauge steel sheet tightly wrapping around a standard wood member to a optimum pre-stressed tension in circumferential direction in order to achieve exceptional structural performance that is superior to that when either steel or wood used alone. The essence of the composite mechanism is that "confinement effect" coupled with "core dilation" produce "two-way lateral interaction" normal to the interface between the two materials, which increases the compressive strength of both materials under general loading.

Researches on constitutional relationship of structural material indicates that brittle materials like wood has the characteristics of the "increased strengthen and ductility under 3-dimentional compressive stress status". In other word, when a wood cylinder is compressed in the direction parallel to grain, it would crack along the length (i.e. split along the grain) and its cross section would expand laterally, and the overall volume would dilate. Therefore, it would fail without a warning at ultimate load, and then unload sharply. This is in fact the inherent material property of all brittle material that are stronger in compression than in tension. However, if the brittle wooden core is confined in the direction perpendicular to grain with a pre-stress metal jacket, then the failure mode would change from suddenly brittle failure to gradual ductile failure. It is because the pre-stressed metal jacket would prevent and limit the core from dilating, creating lateral compressive stress normal to the interface between the two materials thus ensure the core material under 3-dimentional compressive stress status. Therefore, weak brittle material would become stronger ductile material when used as a core. The above "confinement effect" coupled with "core dilation" forms the foundation of the composite stud of this embodiment.

With a calculated amount of initial confinement force (i.e., optimum pre-stressed tension in circumferential direction), not only the ultimate strength can be increased significantly, but also its ductility increased significantly, which is the very wanted characteristics for all structural material, particularly under seismic loading. To achieve the benefits of the "confinement effect", it is important for the wooden core to be tightly wrapped around full perimeter and span the entire length. Any gap around the perimeter could lead to zero confinement force, and forfeit the entire purpose of the composite studs. Any gap along the length of the member could create a weak section that control the failing capacity of the whole member, which also forfeits the purpose of composite studs, but in a different way. In brief, there are two equally critical aspects of the composite studs: (1) confinement effect provided by the outer jacket; and (2) dilation of the brittle inner core under compression.

On the other hand, while the metal jacket provides lateral confinement for the wooden core to increase the compressive strength and ductility of the core, the wooden core also provides lateral support for the metal jacket to prevent the premature local buckling failure of the jacket. Thus, the overall strength and ductility of the new composite member is considerably higher than the sum of those of the wooden core and metal jacket when used alone.

Furthermore, the composite member described herein is environmentally-friendly. First, because of the lateral confinement provided by the metal jacket, recycled material, such as glued wood chips, can be used as core material just as effectively as new lumber. Second, because the metal jacket protects the core from water and weathering, composite studs can be used for exterior construction without chemical treatment. As a result, fewer trees are taken from the environment and fewer pollutants are released into the environment. A popular exterior framing member in the current market is composed of pressure treated lumbers, which consume energy and produce large quantity of waste water during manufacturing and causing chemical pollutions during manufactures and after installations.

FIG. 1 shows construction of composite floor joists 120. Wooden core of standard wood floor joists can be made of saw lumber, or engineering wood like LSL, LVL or PSL 110. The jacket 130, 140, 150 can be made of light-gauged cold-formed steel sheet. Note that in the embodiment shown, the end tags can be bend in to into opposite direction, as needed, for connection. Also note that, in some embodiments, the metal jacket comprises a pattern of pre-punched teeth are designed to bind and anchor the metal jacket to the wooden core in order to develop and maintain the circumferential pre-stress. The size and spacing of the teeth, in one embodiment, are calculated to withstand the confinement force from optimum pre-stress (i.e., the pre-stress required to maximize performance under the composite mechanism of two-way lateral interaction when engaged, as described previously, and as illustrated below see FIG. 5). Additionally, the sizing and spacing can be calculated to withstand a certain additional confinement force resulting from an increasing load.

Figure 2:
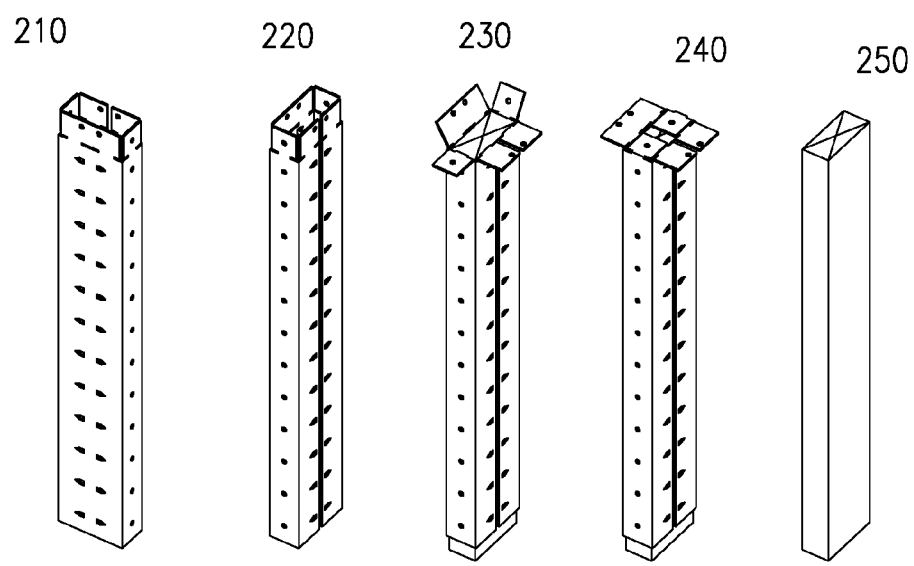
FIG. 2 is a schematic diagram illustrating an example of composite wall studs, according to one embodiment.

FIG. 2 shows construction of composite wall studs 230, 240. Wooden core 250 can be made of standard wood studs, like 2×4, 2×6 etc. Jacket can be made of light-gauged cold-formed steel sheet 210, 220. Note that the end tags can be bend in to opposite direction, as needed, for connection. Note that the metal jacket comprises a pattern of pre-punched teeth designed to anchor the metal jacket to the wooden core in order to develop and maintain the circumferential pre-stress. The size and spacing of the teeth are calculated based on the amount of optimum pre-stress from confinement forces, required to maximize the composite mechanism of two-way lateral interaction, as described previously (see FIG. 7 for illustration of optimum pre-stress performance).

Figure 3:
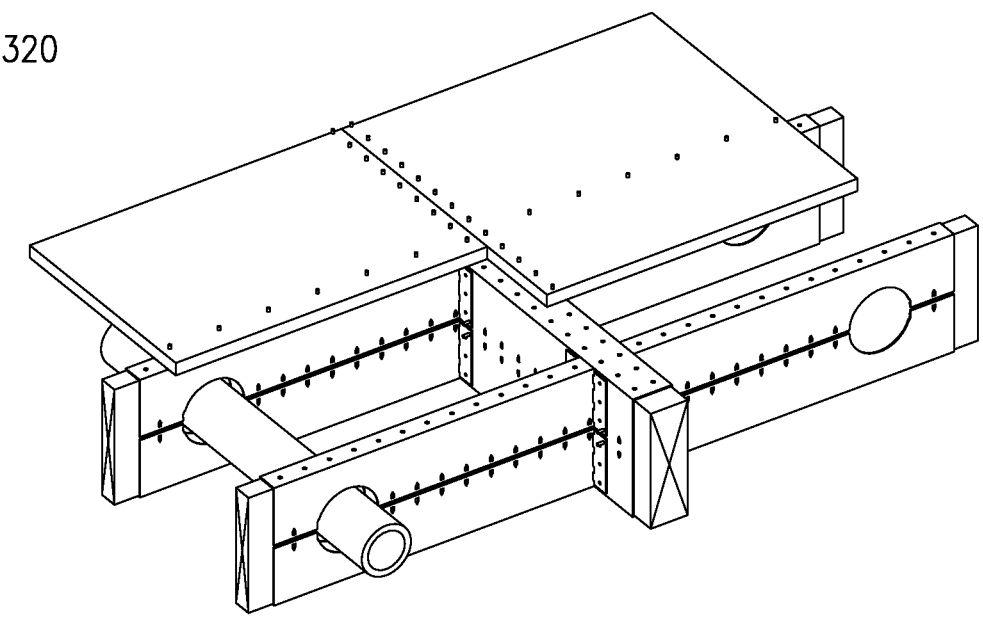
FIG. 3 is a schematic diagram illustrating an example of partial composite gravity framing system, according to one embodiment.
Figure 3:
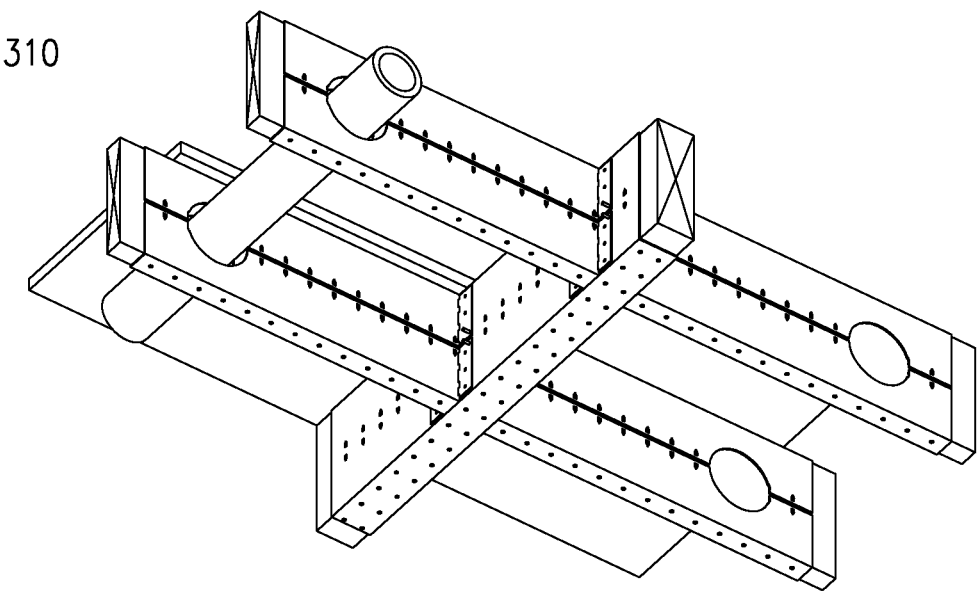

FIG. 3 shows a composite gravity framing system. The connection concept of the entire system can be similar to a LEGO piece, with pre-punched holes in a certain pattern that matched for different sides and directions. In this case, there are four pre-punched holes at tags at each joist end, the location of which match the teethed holes at the sides of composite girder. These allow quick temporary field installation without drilling. Additional nails or screws can be added afterward, by different crews, for higher capacity as needed. Drilling may be needed depending on the thickness of the metal jacket. There are also pre-punched holes at the metal jacket for HVAC ducks. There is no need for field cutting of any metal sheet. AS shown in top view 320, plywood floor sheathing and gypsum ceiling board can be nailed or screwed directly into framings without drilling, because there are already pre-punched holes at 2 inch apart at the top and bottom of the framing. A bottom view 310 is also shown. A ceiling board not shown for the purpose of clarity.

Figure 4:
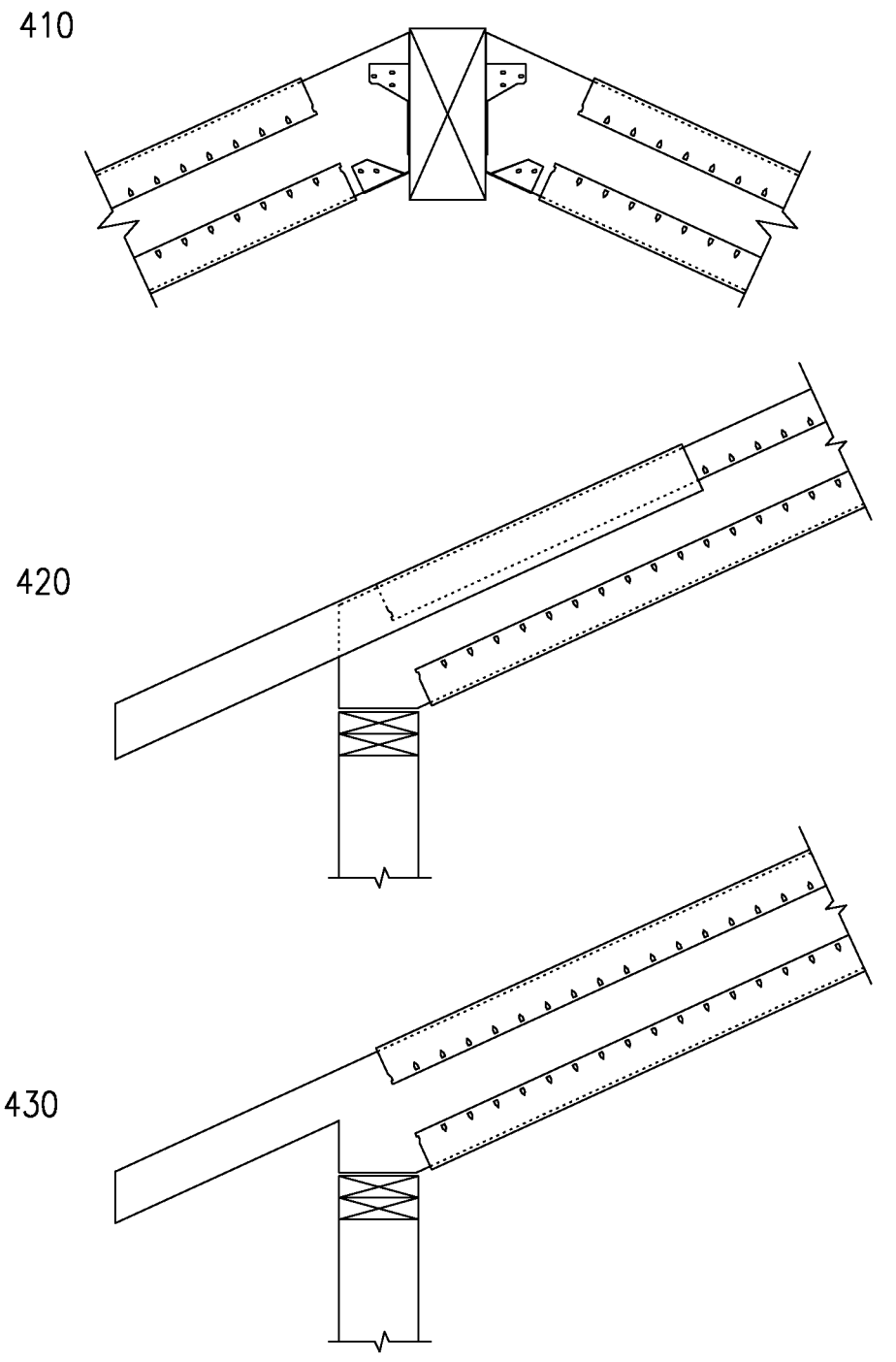
FIG. 4 is a schematic diagram illustrating an example of composite joist used as roof rafter, according to one embodiment.

FIG. 4 shows a composite joist 410 used as roof rafter. Connection to ridge beam made of regular wood. By stripping off a small portion of metal jacket at the end, a composite rafter can easily and seamlessly fit into conventional wood framing without special tools. This is particularly useful when just one or a few heavily loaded members call for higher strength. Without increasing the depth of entire roof framing, significant saving can be achieve to use composite joists for selected member, and the remaining majority still using regular wood members. For example, 2×12 at 16 inch on center regular wood joists may be needed without composite joists, versus 2×10@24 inch on center with using one or two composite joists. Rafter tail connection design one 420 is achieved by stripping off a small portion of metal jacket at field without special tool, and nail a regular 2× rafter tail to the composite rafter. Rafter tail connection design two 430 is achieved by stripping off a longer portion of metal jacket and cut it to require shape, just as a regular 2× wood rafter.

Figure 5:
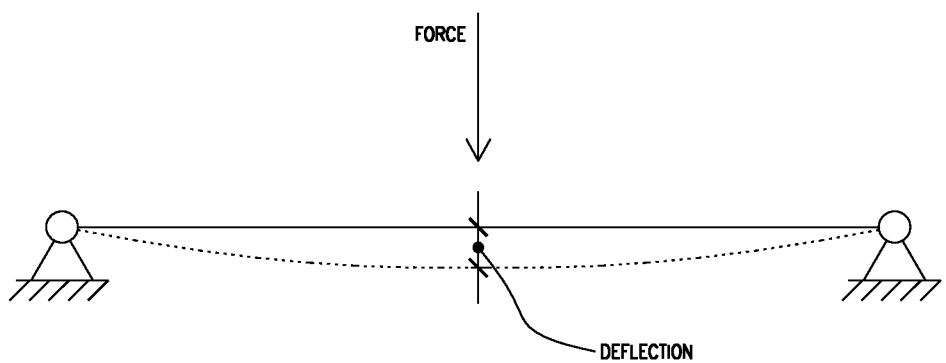
FIG. 5 is a graph illustrating an example comparison of performance of composite beam with that of wood beam and metal stud beam, according to one embodiment.
Figure 5:
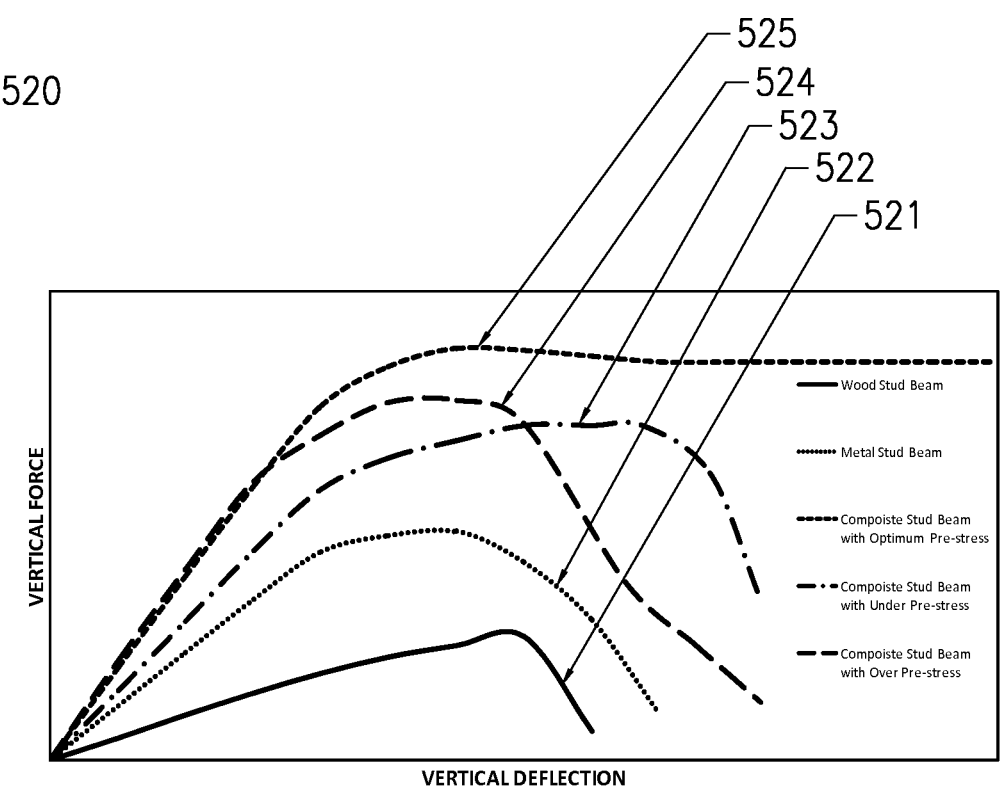

FIG. 5 includes a graph 520 showing a comparison of deflection performance of composite studs when loaded as a beam 510, where the upper part of a beam is within compression zone, the lower part is within tension zone, and the interface between tension and compression zone is a natural surface. The composite mechanism of two-way lateral interaction occurs primarily within the compression zone. In the tension zone, the metal jacket provide most of the tension capacity similar to that of a steel rebar in a concrete beam, but there is essentially no composite mechanism of two-way lateral interaction in tension zone. The example shown compares deflection curves of composite studs with different amounts of pre-stress (i.e., optimum pre-stress 525, under pre-stress 523, and over pre-stress 524) against a wood beam 521 and metal stud beam 522. It shows that, due to the composite mechanisms, there is a significant increase in both strength and ductility for composite joists 523, 524 and 525. However, for an under pre-stressed composite beam 523, since it lacks adequate confinement at initial stage to limit the core dilation, the wooden core has to dilate too much in order to reach optimum confinement force. Therefore, it would still split and fail prematurely. In contrast, for an over pre-stressed one 524, the initial internal forces could damage both the wooden core and metal jacket, potentially causing the metal jacket to fail before reaching the optimum strength and ductility. Research indicate that the composite beam with optimum pre-stress 525 is preferred to achieve the desired performance of maximum strength and ductility. With the optimum amount of initial confinement 525, the wooden core could dilate gradually under compression. In this case, the confinement force and composite interaction increase as loading goes up until the jacket breaks with matured tension failure. This process drives the material potential to its limit. In other words, it is through the controlled adjustment of the amount of pre-stress (i.e., initial confinement force) that ultimate structural performance of the composite joints is achieved. As examples of the two extreme cases: (1) zero confinement force (i.e., composite stud when being loosely or snugly wrapped), there will be zero or very little composite interaction; (2) Maximum initial confinement force (i.e., pre-stress equals the yield force of metal jacket), the metal jacket will burst by itself without much additional loading. By adjusting the amount of initial confinement force (i.e., tightness of wrapping), there will be a sweet spot that produces the ultimate structural performance. The sweet spot may vary for different applications to applications, and can be determined through testing and/or advanced finite element analysis.

Figure 6:
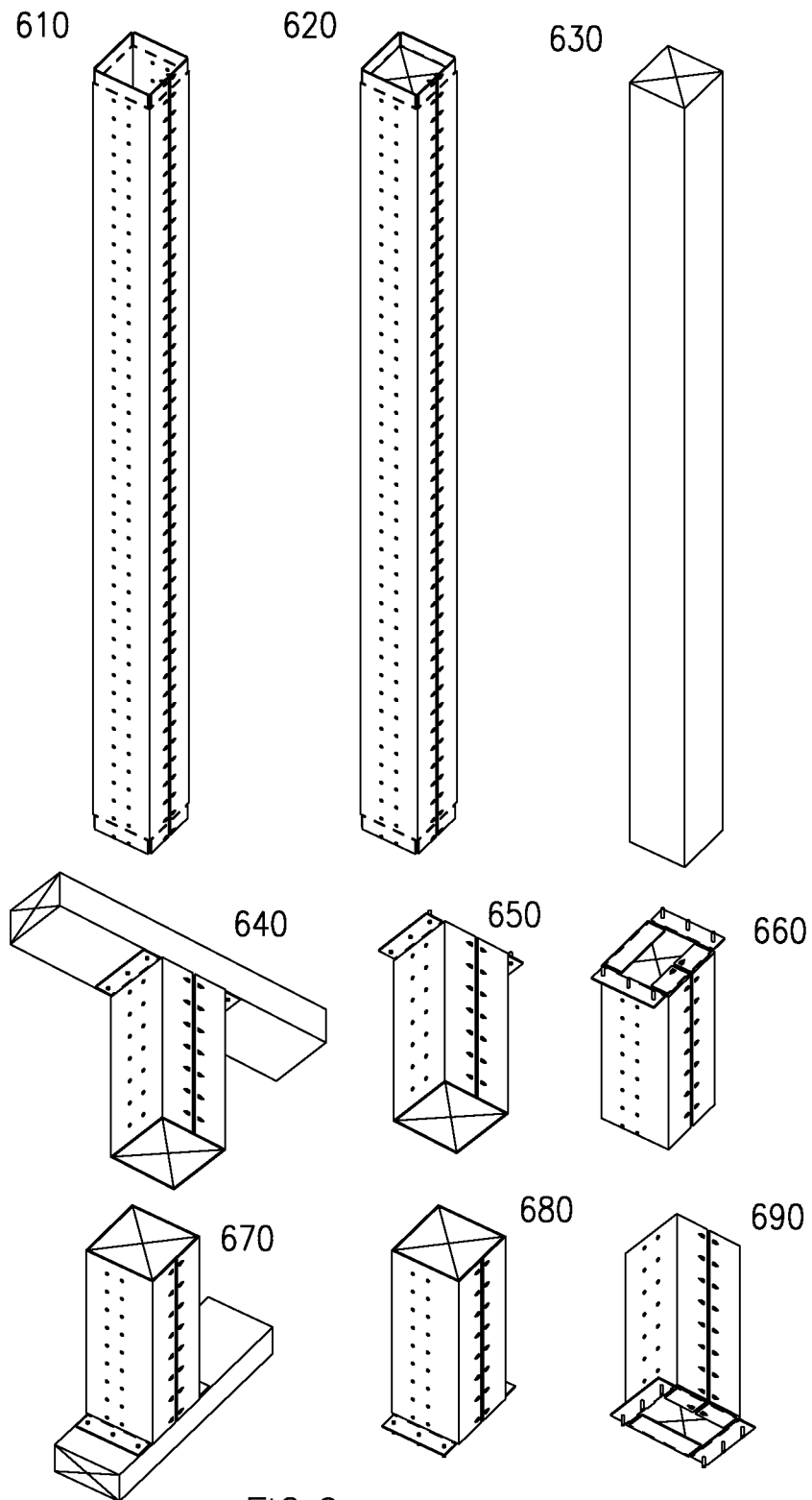
FIG. 6 is a schematic diagram illustrating an example of composite post or column, according to one embodiment.

FIG. 6 shows construction of composite post or column. In metal jacket 610, there are two rows of pre-punched holes at 2 inch on center at all four sides. These holes are for connection wall sheathing with regular nails or screws. Since the location pre-made at factory, it can easily achieve more precise nailing pattern without measurement. The construction quality will be dramatically improved. It is particularly true for residential constructions, since contractors and workers in the sector of residential projects can lack rigorous training and skills. For example, when approved plans call for 4 inch on center nailing pattern, workers at field may not follow the instruction precisely. Consequentially, nailing can be anywhere between 3 to 5 inches. With pre-punched metal jacket, it will be much easy for both worker and inspector.

A wooden core post 630 can be 4×4, 6×6, 4×6 saw lumber or engineering wood like LVL or PSL. Currently, when the strength of a 6×6 saw lumber is not adequate, the engineer would use a 6×6 PSL to substitute. However, PSL is not only 3-4 times more expensive than saw lumber ones, but also does not shrink like a saw lumber over the time. This sometimes can cause problems of distort deformation and/or cracks on the wall finishing. Composite post 620 is expected much cheaper and more compatible than the PSL counterpart.

When installed in a stud wall, composite post can easily connected to top plate 640, 650, 660. The technique avoids the use of toe nailing, which is the traditional method and having very low capacity.

Connection of a composite post to a regular bottom plate is similar to top 670, 680, 690. Note that two pairs of end tags are bended towards inside, this will dramatically increase end bearing capacity, and achieve higher design load.

Figure 7:
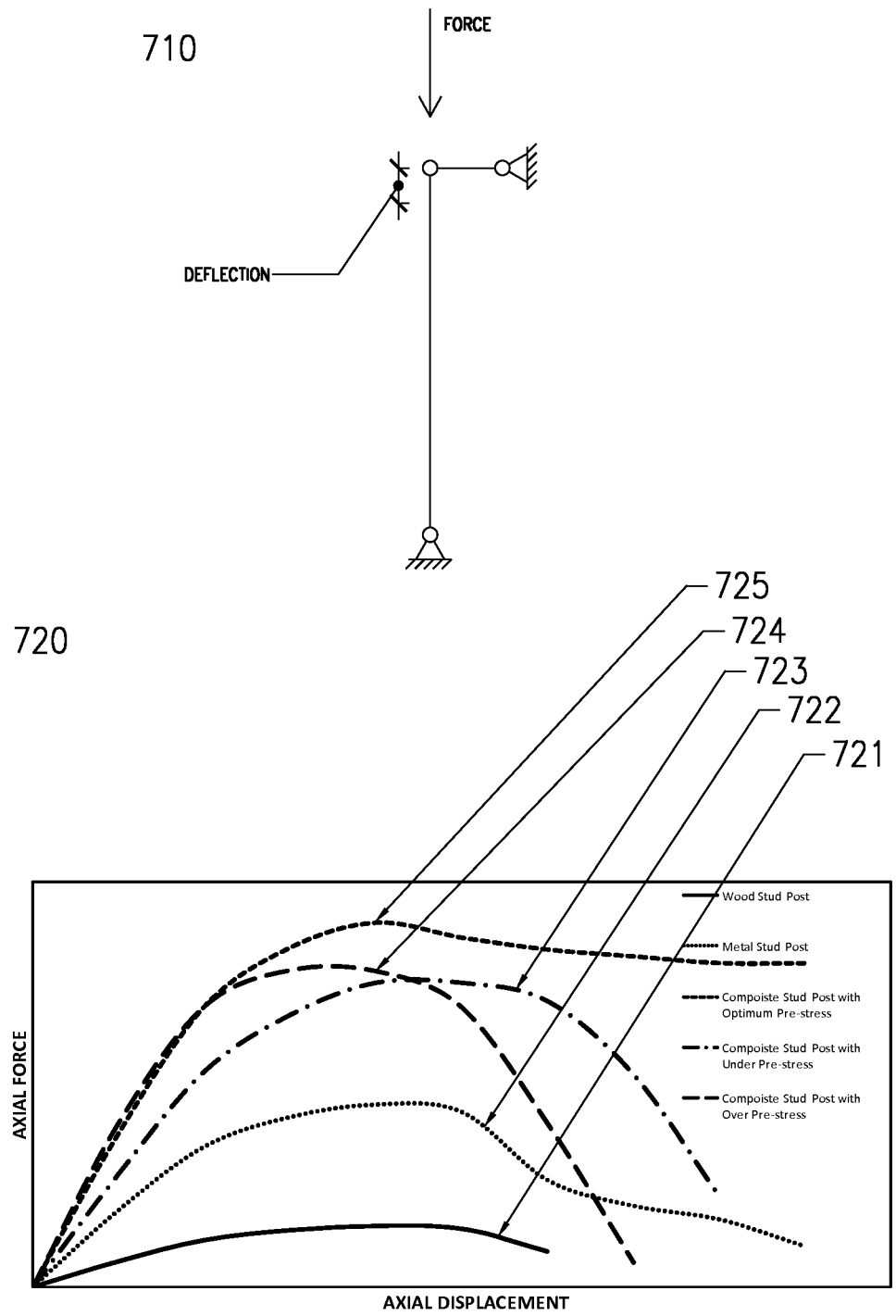
FIG. 7 is a graph illustrating an example comparison of performance of composite post with that of wood post and metal stud post, according to one embodiment.

FIG. 7 includes a graph 720 showing a comparison of axial displacement performance of composite studs when loaded as a column 710, where the entire member is within compression zone and has composite mechanism of two-way lateral interaction. The figure compares deflection curves of composite studs with different amount of pre-stress (i.e., optimum pre-stress 725, under pre-stress 723, and over pre-stress 724) against a wood post 721 and metal stud 722. It shows that, due to the composite mechanisms, significant increase in both strength and ductility are expected for composite studs 723, 724 and 725. Similar to what already described in FIG. 5, the composite stud with optimum pre-stress 725 can achieve the desired performance of maximum strength and ductility, since both under pre-stressed 723 and over pre-stressed 724 composite studs would fail prematurely. The magnitude of the optimum pre-stress may vary depending dimensions and properties of both wooden core and metal jacket, and it can be determined through testing and/or advanced finite element analysis.

Figure 8:
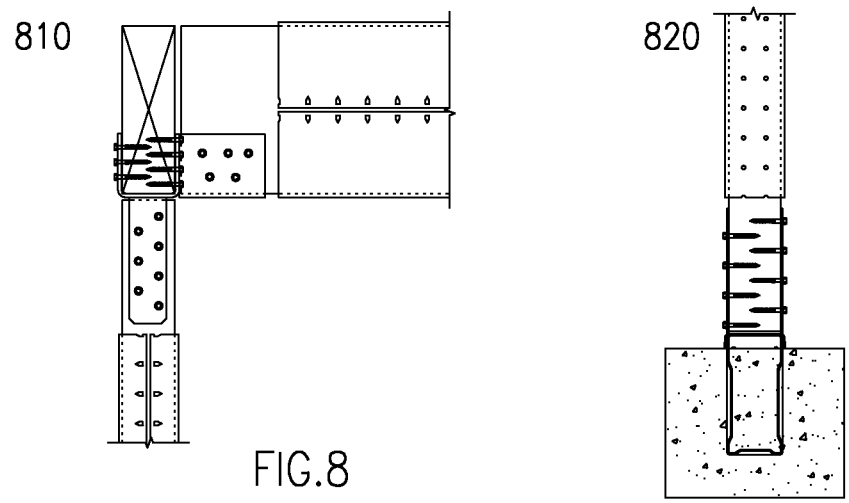
FIG. 8 is a schematic diagram illustrating an example of composite post installed as an isolated column, according to one embodiment.

FIG. 8 shows a composite post installed as an isolated column. In a top connection 810, a top portion of metal jacked is stripped off at the ends as needed, third party off-the-shelf connection hardware can be used, just like a regular wood posts. Again, this allows composite posts fit into conventional wood construction easily and seamlessly. In a bottom connection 820, a composite post is connected to concrete foundation at bottom similarly.

Figure 9:
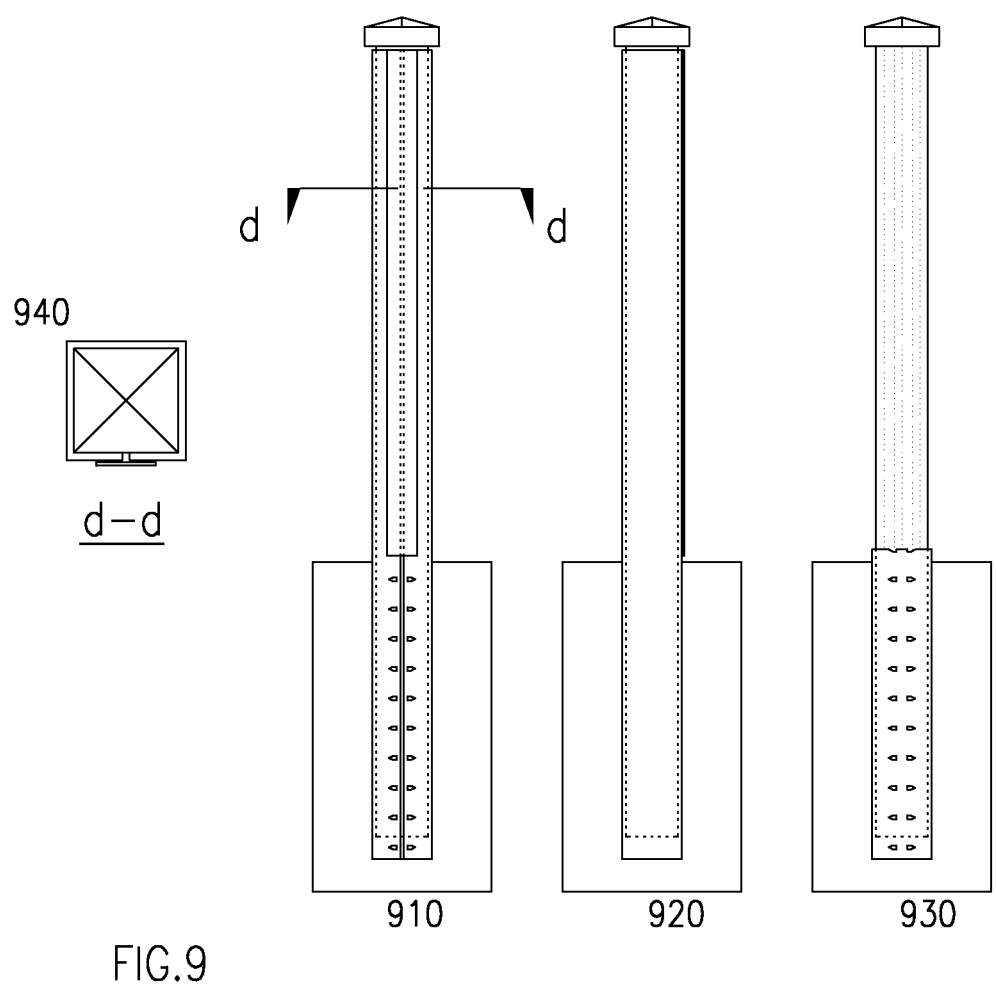
FIG. 9 is a schematic diagram illustrating an example of composite post used as exterior fence post, according to one embodiment.

FIG. 9 shows a composite post used as exterior fence post. Because metal jacket protects the wooden core from water and weathering, it will be much more durable than that of conventional construction using pressure treated wood posts. With small increase cost, the composite fence post is expected last several times longer than wood one. As shown, there are no pre-punched holes on three of the four sides of composite post 910, 920 for water proofing. A top view of the same post 940 shows water proofing tape used to seal the gap and teethed holes.

When the metal jacked deteriorates over the time due to wreathing, it can be easily stripped off from the bottom, exposing a brand new wood post 930 which can last many more years. The metal jacket can be recycled to minimize the environmental impact.

Figure 10:
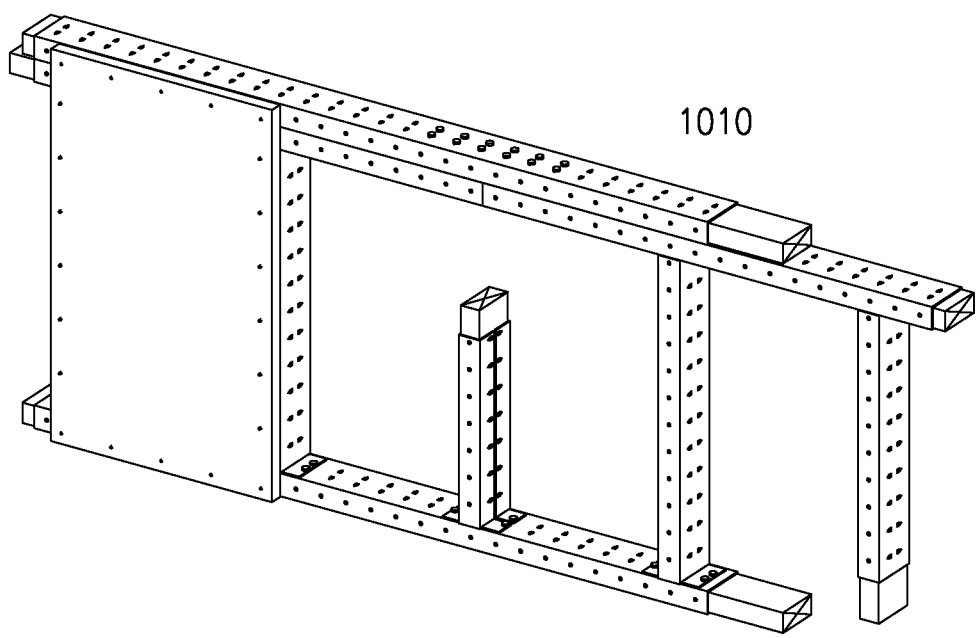
FIG. 10 is a schematic diagram illustrating an example of composite studs used in a load bearing wall with splice at top for cord continuity, according to one embodiment.

FIG. 10 shows composite studs used in a load bearing wall 1010 with splice at top for cord continuity. The construction is very similar to conventional stud wall construction, except that is entirely made of composite studs. Much higher load-capacity is expected due to higher member and connection strength. Note that LEGO like pre-punched hole patterns on the metal jackets allows precise nailing achieved easily without field drilling and measuring. Also, wall sheathing can be easily attached from either or both sides with high strength and better quality.

Figure 11:
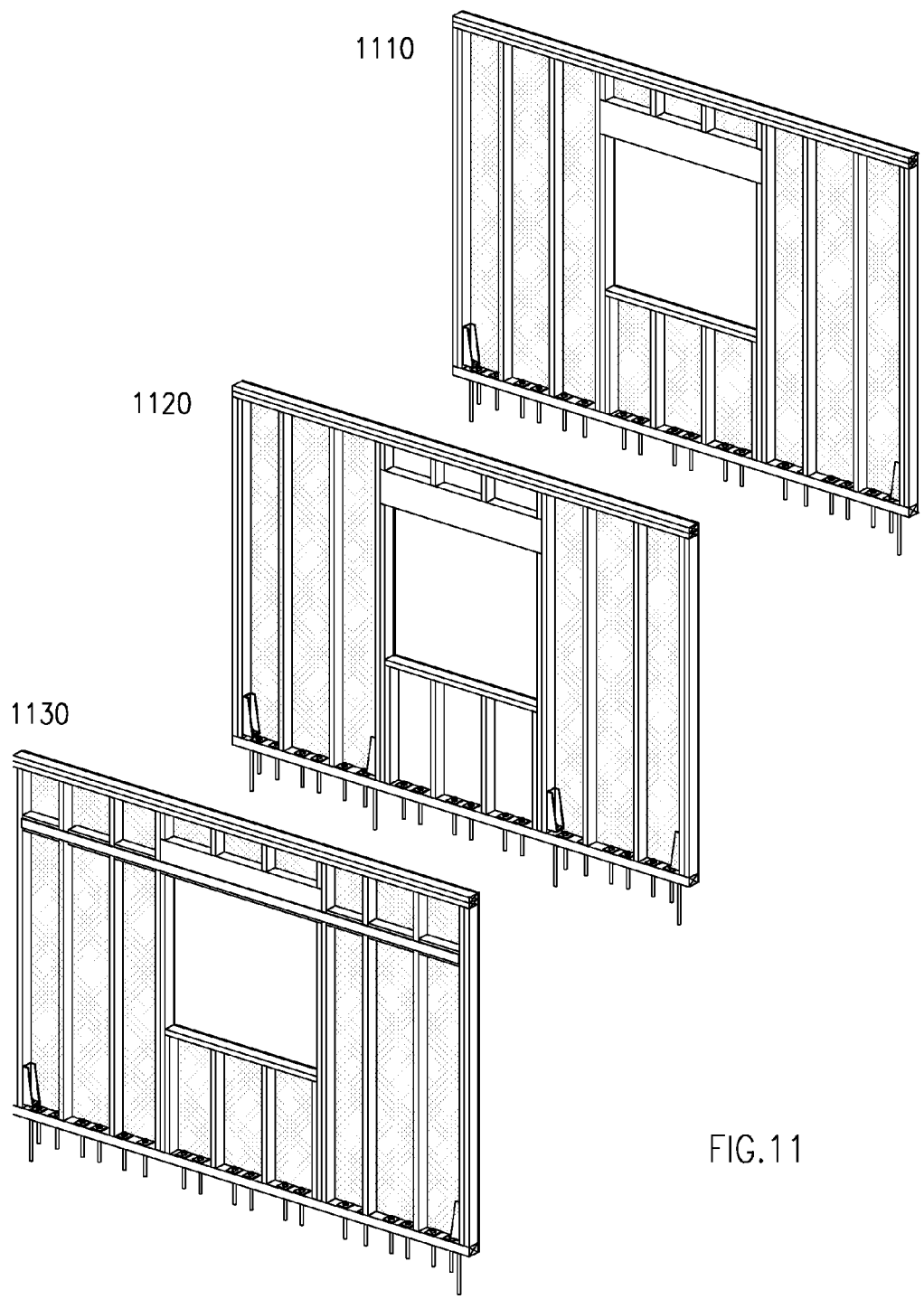
FIG. 11 is a schematic diagram illustrating an example of composite studs used in typical construction of light-framed shear walls, currently used in residential building and low-rise commercial structures, according to one embodiment.
Figure 23:
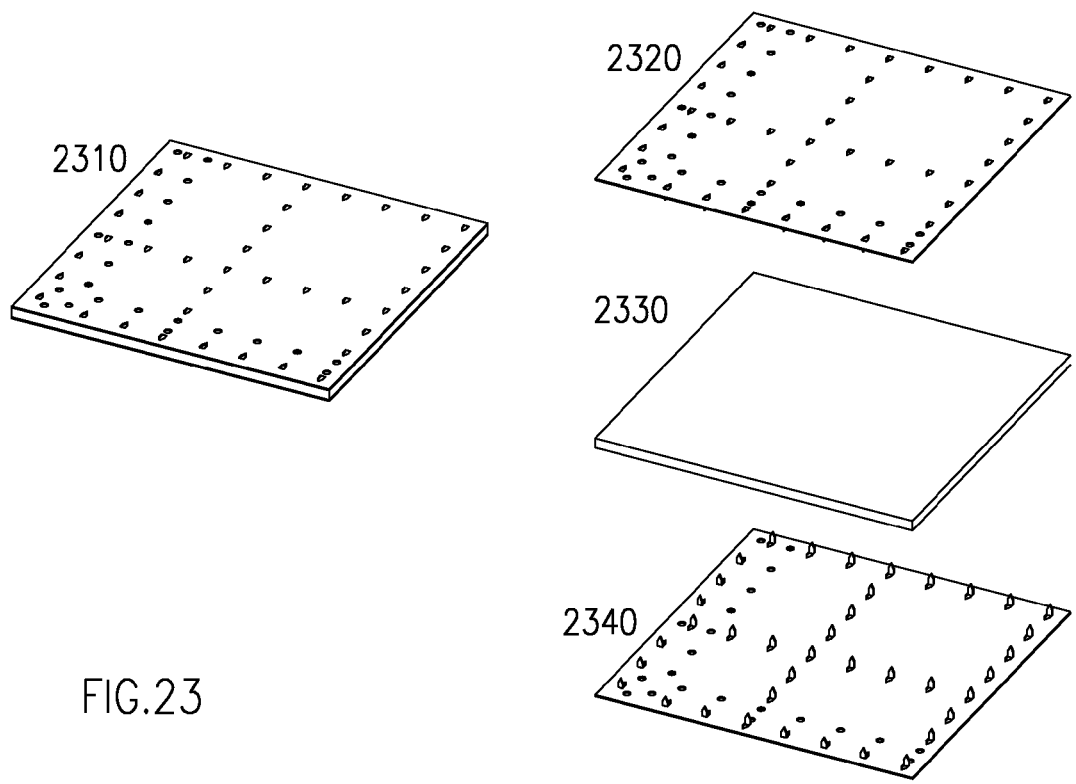
FIG. 23 is a schematic diagram illustrating magnified views of composite sandwich board of FIG. 22, according to one embodiment.
Figure 24:
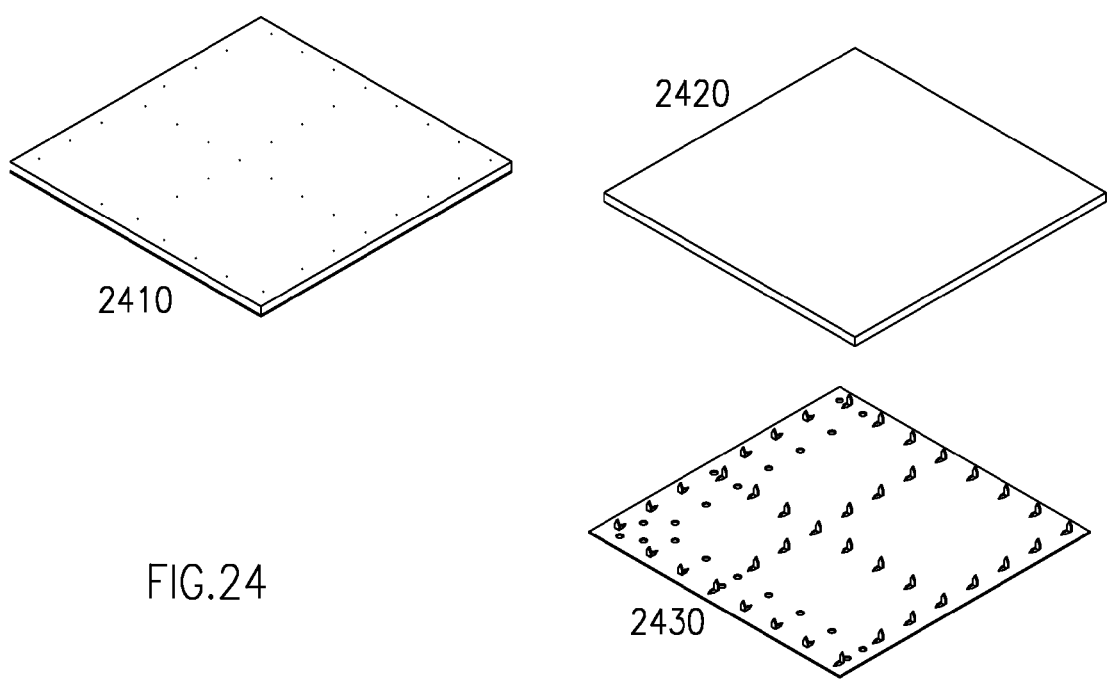
FIG. 24 is a schematic diagram illustrating magnified views of composite laminated board of FIG. 22, according to one embodiment.

FIG. 11 shows construction of light-framed shear walls for residential building and low-rise commercial structures. The top and bottom plates and vertical studs are all made of composite studs, while conventional construction uses either wood studs or metal studs. Depending on the demand on strength and ductility, the sheathing could be either composite sandwich board or composite laminated board as shown in FIGS. 23 and 24. However, the performance of composite stud wall will be dramatically improved. A perforated shear wall construction 1110, a segmented shear wall construction 1120, and a shear wall with force transferring mechanism around opening 1130 are shown as examples.

Figure 12:
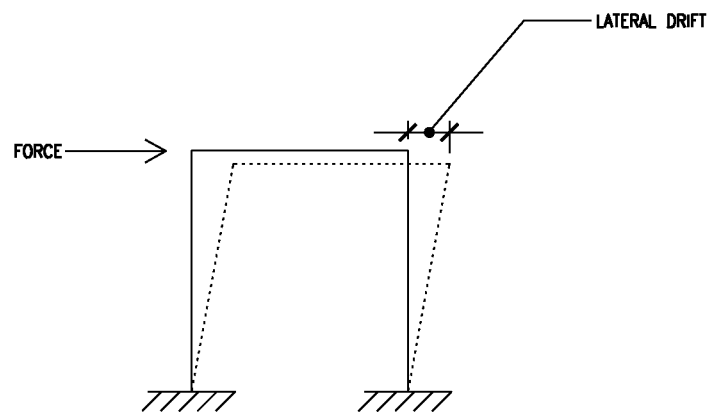
FIG. 12 is a graph illustrating an example comparison of performance of composite shear wall with that of wood stud or metal stud shear walls, according to one embodiment.
Figure 12:
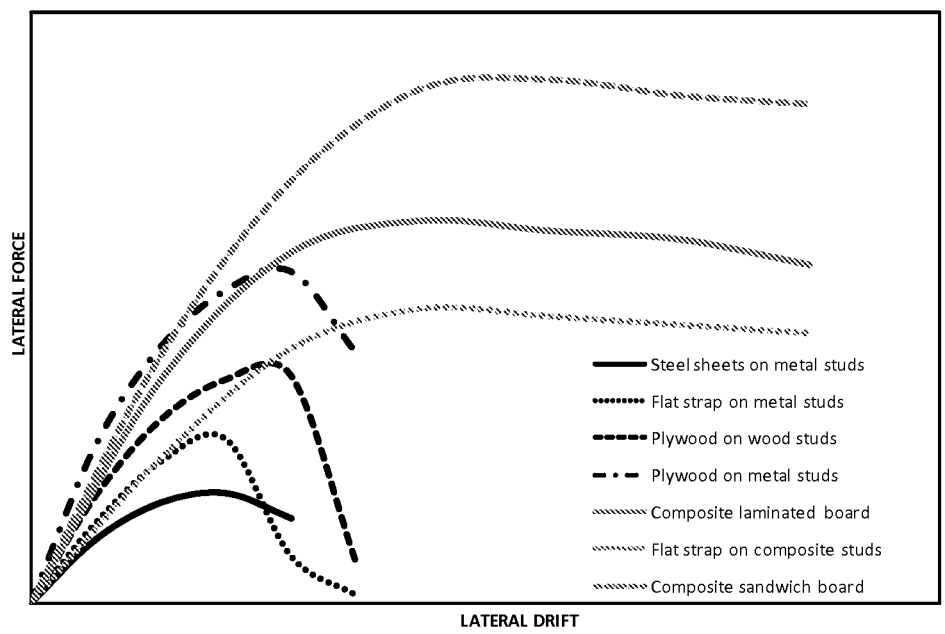

FIG. 12 shows a graph 1210 comparing lateral drift 1210 performance of composite shear wall with that of wood stud or metal stud shear walls. There is a significant increase in both strength and ductility for composite shear walls. Note that the studs used in the three composite shear walls all have optimum pre-stressed tension (without showing the under pre-stressed or the over pre-stressed scenarios) in circumferential direction around substantially the entire perimeter of the wooden core of the composite member and spanning the entire length.

Figure 13:
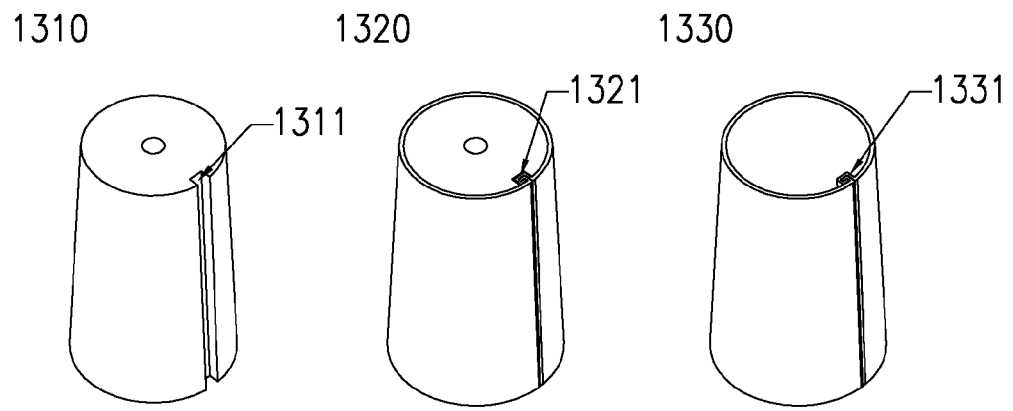
FIG. 13 is a schematic diagram of a circular composite pole of truncated-cone shape, according to one embodiment.

FIG. 13 shows a circular composite pole of truncated-cone shape. A solid core has a truncated-cone shape 1310. The core can be made of either regular wood, or engineering wood. For light duty usage, expansive foam, or plastic can also be used. The straight groove along the height at the perimeter is to allow metal jacket being bent into, forming a smooth exterior finishing surface for the final product. The hole at the middle is for electrical wires and cables going-through when needed, street light poles, for example. A light-gauged cold-formed steel or stainless steel jacket 1330 is attached to the perimeter of core to form a composite pole 1320. Note that there is a self-engaging clasp 1331 along the length of the metal jacket fitting within the wooden core groove 1311 to anchor the opposite longitudinal edges of the metal jacket in order to develop and maintain the optimum circumferential pre-stress. In some embodiments (e.g., 1321), a groove is slotted into the wooden core so that the surface remains flush even with the self-engaging clap. As described herein, the self-engaging clasp can be designed to withstand the initial confinement force from an optimum pre-stress on the metal jacket, and additional confinement force resulting from an increasing load.

Figure 14:
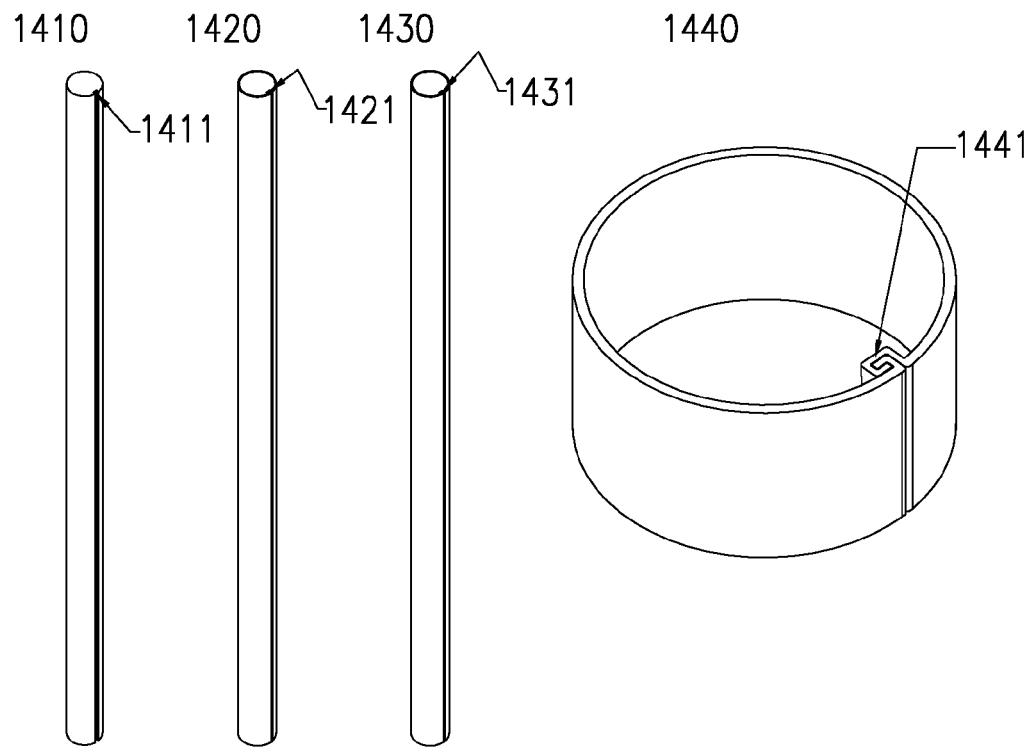
FIG. 14 is a schematic diagram of a circular composite rod, according to one embodiment.

FIG. 14 shows a circular composite rod. A solid wood rod core with a straight groove along the height at the perimeter 1410 allows light-gauged cold-formed steel or stainless steel jacket 1430 to be bent into, forming a smooth exterior finishing surface for the final circular composite rod 1420. Similar to that of FIG. 13, there is a self-engaging clasp 1431, 1441 along the length of the metal jacket fitting (and an optional slotted groove) within the wooden core groove 1411 to anchor the opposite longitudinal edges of the metal jacket in order to develop and maintain the optimum circumferential pre-stress.

Figure 15:
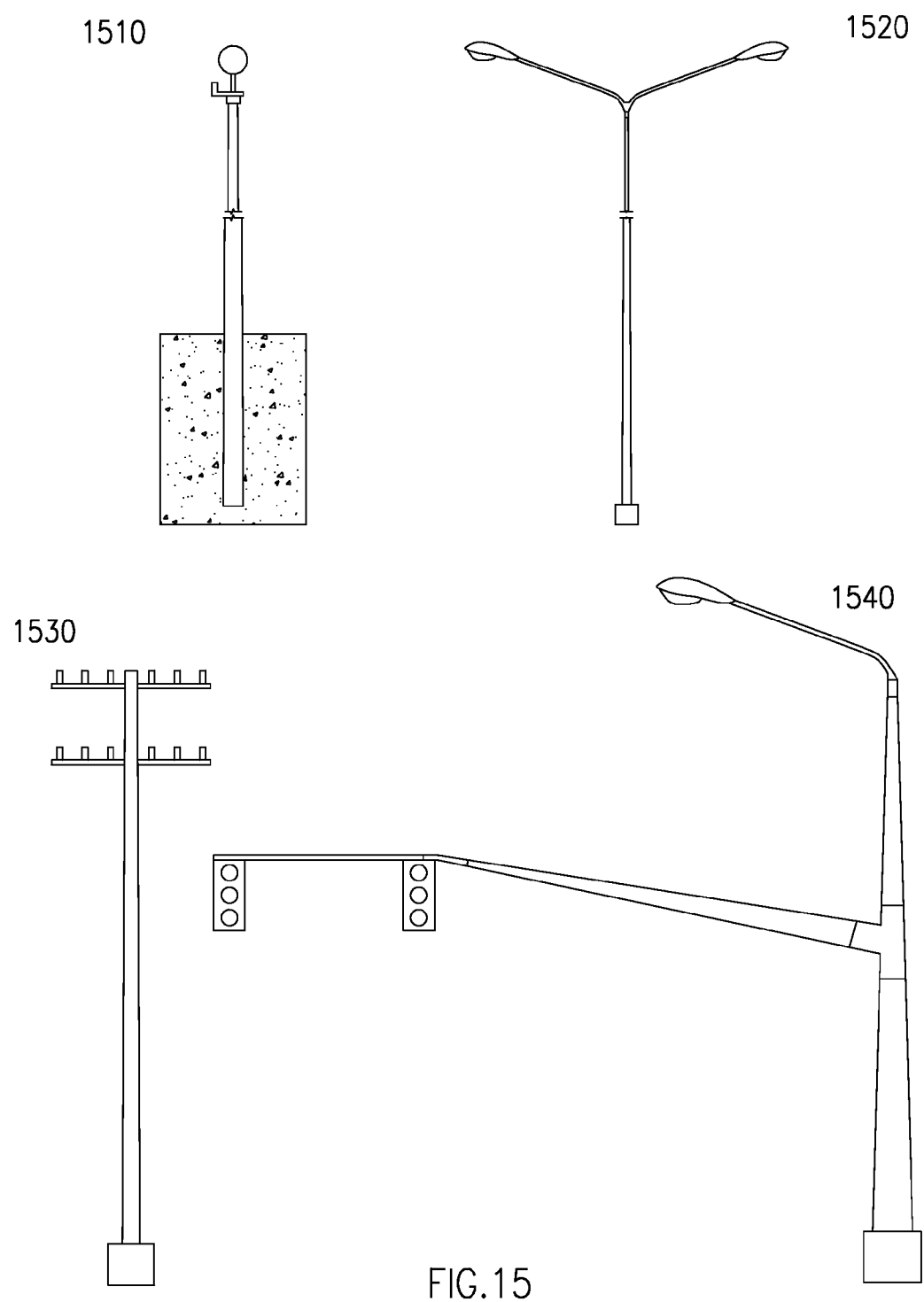
FIG. 15 is a schematic diagram illustrating an example of the composite poles of FIG. 13, according to one embodiment.

FIG. 15 shows example applications of metal-jacket composite poles of FIG. 13. As a greener, lighter and cost effective alternative, the light-weighted products are intended to replace many heavy steel or concrete infrastructures such as flag poles 1510, street light poles 1520, street poles for electrical and telecommunication wire and cables 1530, and traffic signal lights and signs supporting structures 1540. In another embodiment, poles can be used to build wind turbine supporting structures and power transmission towers.

Figure 16:
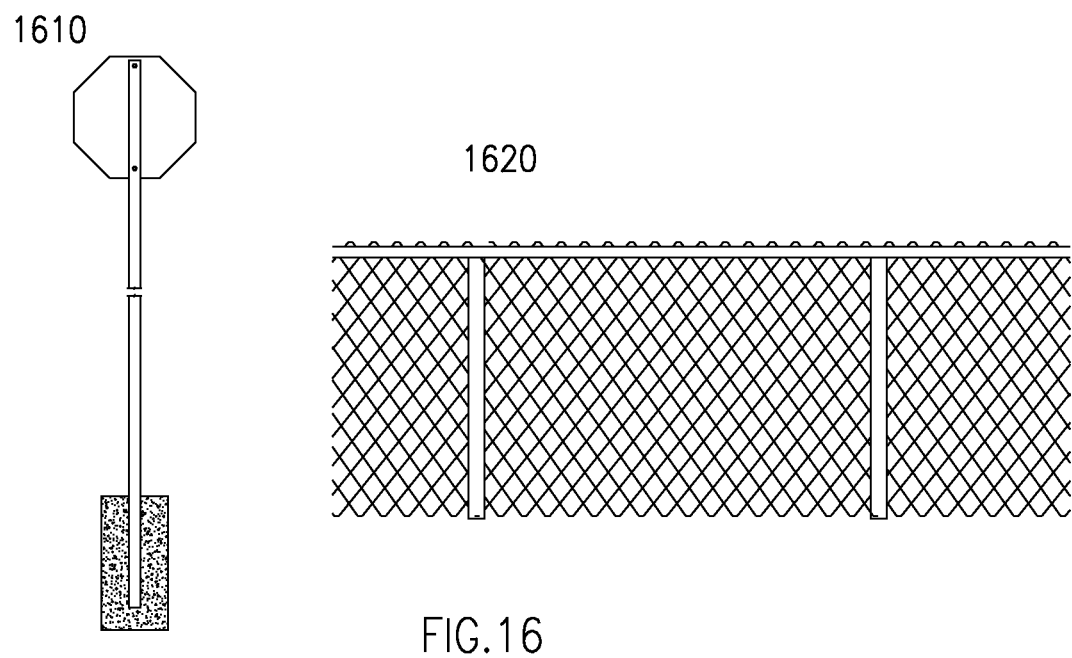
FIG. 16 is a schematic diagram illustrating an example of the composite rods of FIG. 14, according to one embodiment.

FIG. 16 shows example applications of metal-jacket composite rods of FIG. 14. As a greener, lighter and cost effective alternative, this product is intended to replace steel pipe in many light weight supporting structures such as traffic sign poles 1610, and poles for wire mesh fence 1620.

Figure 17:
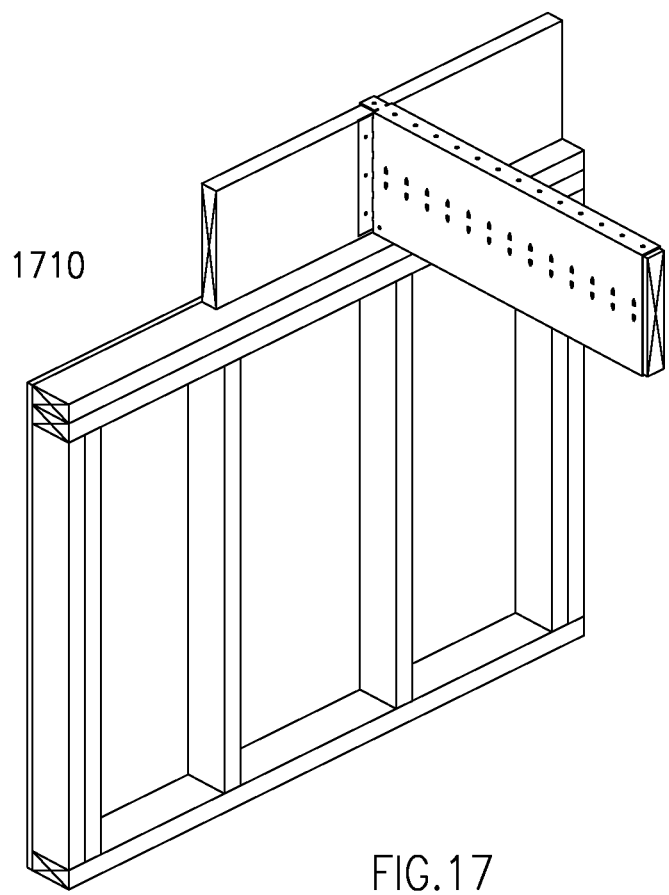
FIG. 17 is a schematic diagram illustrating composite joist used as floor framing supported on a typical stud wall, according to one embodiment.

FIG. 17 shows a composite joist used as floor framing supported on a typical stud wall 1710.

Figure 18:
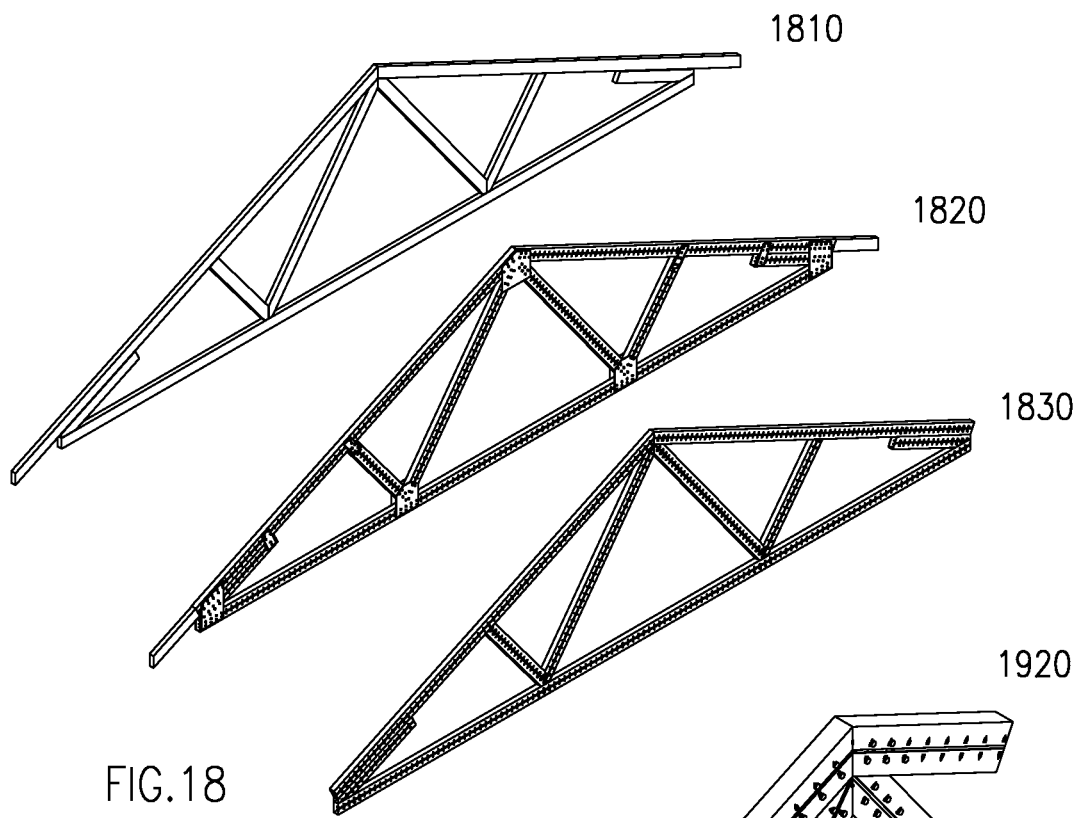
FIG. 18 is a schematic diagram illustrating a triangular roof truss made of composite studs, according to one embodiment.

FIG. 18 shows a triangular roof truss made of composite s studs. Since both member and connections are much stronger than traditional wood or metal trusses of similar configurations, the composite truss is expected to span much longer for the same member sizes. It will expand the applicable range of traditional trusses. In other words, in some situations where steel W-shaped beams are the best solutions, now composite truss become a better and cheaper choice. Wood cores 1810 and metal jackets 1830 are used for composite studs which connected together with steel plates and screws, to form a composite roof truss 1820.

Figure 19:
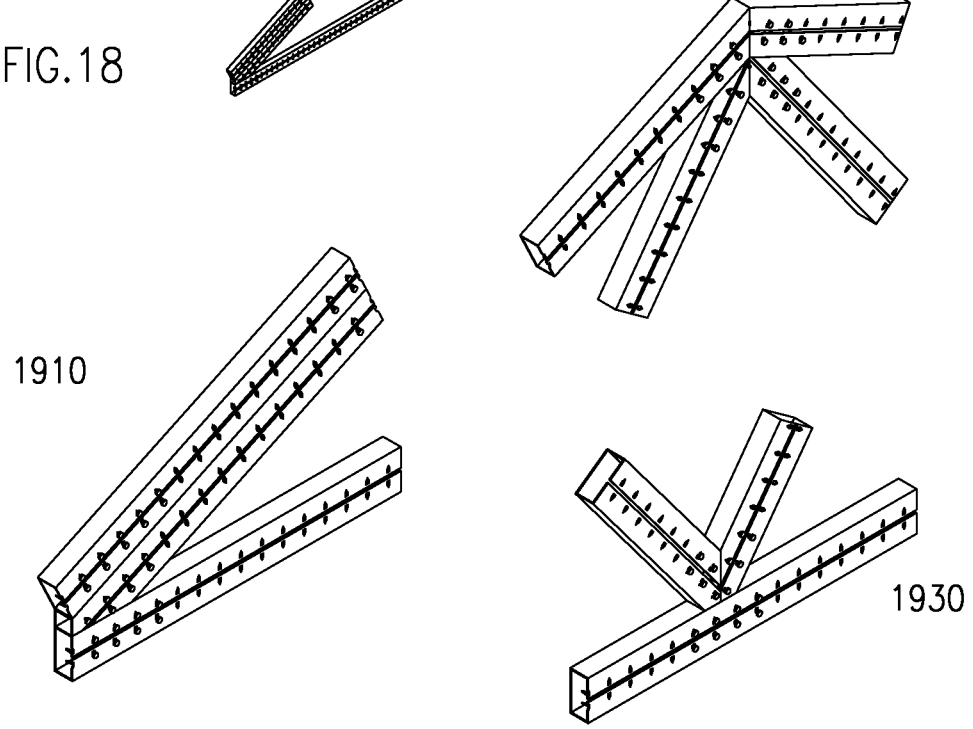
FIG. 19 is a schematic diagram illustrating magnified views of truss connections shown in FIG. 18, according to one embodiment.

FIG. 19 shows magnified views of typical connection of the truss shown in FIG. 18. The screws are shown, but connection plates not shown for clarity. In particular, a connection at support 1910, a connection at top 1920, and intermediate connection at bottom code 1930 are shown.

Figure 20:
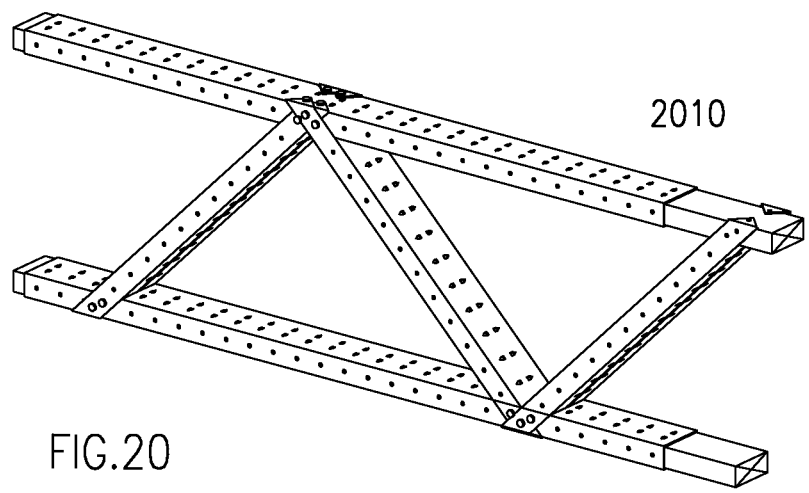
FIG. 20 is a schematic diagram illustrating segment of open web truss made of composite studs, according to one embodiment.

FIG. 20 shows a segment of open web truss made of composite studs 2010. Since both member and connections are much stronger than traditional wood and metal trusses of similar configurations, the composite truss is expected to span much longer for the same member sizes. It will expand the applicable range of traditional trusses. In other words, in some situations where steel W-shaped beams are the best solutions, now composite truss become a better and cheaper choice.

Figure 21:
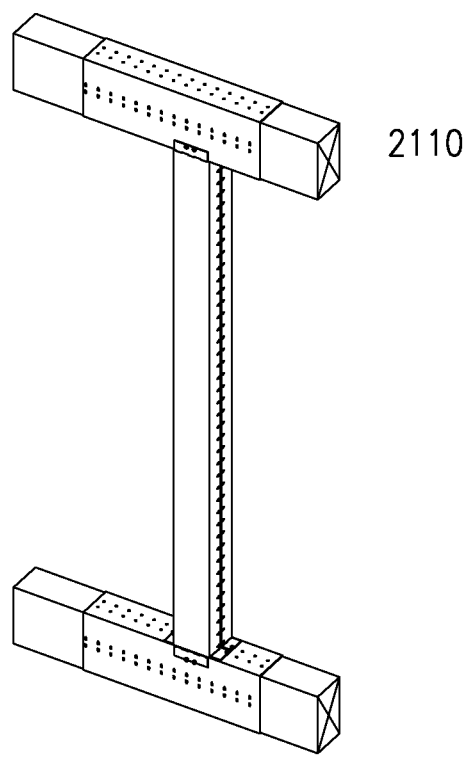
FIG. 21 is a schematic diagram illustrating composite post with composite beams at bottom and top, according to one embodiment.

FIG. 21 shows a composite post with composite beams at bottom and top 2110.

Figure 22:
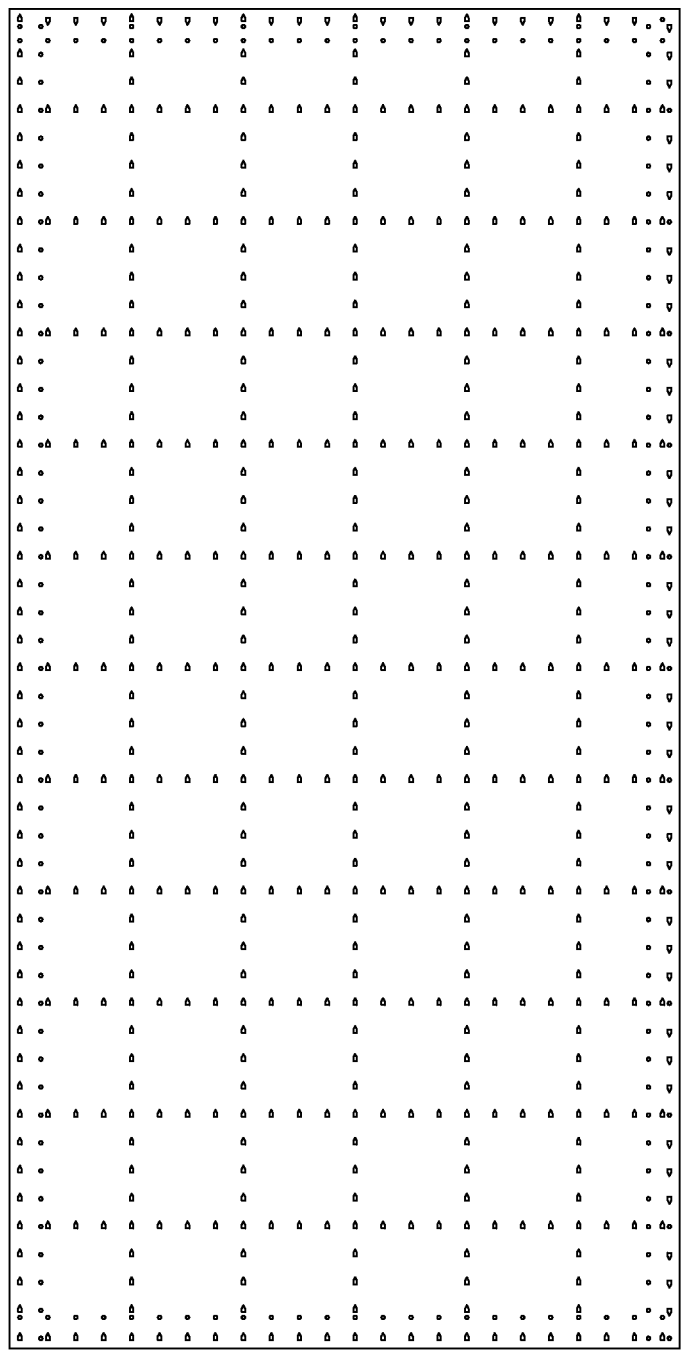
FIG. 22 is a schematic diagram illustrating composite sheathing board made with laminations or sandwich of plywood and metal sheets, according to one embodiment.

FIG. 22 shows a composite sheathing board with laminations or sandwich of plywood and metal sheet 2210. The plywood and the metal sheet are connected using glue and pre-punched teeth. It is of the same dimensions as typical plywood, i.e., 4 ft×8 ft. There are additional pre-drilled circular holes on the metal sheet. These holes follow certain pattern to allow convenient nailing at field without additional drilling. This type of sheathing is intend to be used in combination with composite stud to form a new type of shear wall systems, as shown in FIG. 11. The performance is expected much better than traditional shear walls, either wood or metal ones, as illustrated in FIG. 12.

FIG. 23 shows magnified views of composite sandwich sheathing board as shown in FIG. 22. Specifically, composite sandwich board 2310 is formed by gluing a metal sheet 2320, 2340 to both face of a wooden board 2330. There are pre-punched teeth and pre-drilled holes on the metal sheet for increased binding and easy nailing.

FIG. 24 shows magnified views of composite laminated board shown in FIG. 22. Plywood 2420 and a metal sheet with pre-punched teeth and pre-drilled holes 2430 are glued together to form a piece of composite board 2410.

The only difference between composite laminated board 2410 and composite sandwich board 2310 is that one has metal sheet on only one face for higher performance, but the other has metal sheet on both faces for maximum performance.

The following examples provide additional embodiments.

Example 1

Composite stud and rod, joist, beam or post, comprising a core member that is made of either saw lumber, or engineering wood of any kind, which is of typical sizes, including square, rectangular or circular cross sections. A metal jacket wraps tightly around the perimeter of wood core section to an optimum pre-stressed tension in circumferential direction. The metal jacket wraps the wood core along an entire length in this particular embodiment, and is bonded and anchored to the wood using any one or more of the following connecting methods: pre-punched teeth of any pattern that bite into the wood core, or metal nails or screws that spaced at certain distance along the length of the composite member at any pattern. When the metal jacket fully wraps the core section perimeter with a overlap, the edges of the metal jacket are welded together to seal the wood core using either spot welding, or segment welding, or their combinations, or full length welding. When the metal jacket fully wraps the core section perimeter with a overlap, the metal jacket is closed by twist and/or bending the overlap in any form. The above connecting methods are designed to develop the required initial confinement force (i.e. optimum pre-stressed), and withstand the confinement force throughout the loading process until the ultimate material potential of both wooden core and metal jacket are fully developed. In other word, the connection capacity is engineered to develop the optimum pre-stress and composite mechanism of two-way lateral interaction.

The wood core can be solid, without void (except a small circular hole at center for wire and cable going-through), and is made of one piece or several segments of wood or engineered plastic or foam of any kind, or any other material having similar properties, or the combination of the above materials. The metal jacket can be made of one piece, or of several pieces of light-gauged cold-formed steel sheets, or stainless steel, aluminum, copper or alloy sheets, or any other metal sheets having similar properties, or the combination of the above material. The composite stud is with or without connecting tags or caps at one or both ends. The metal jacket is with or without pre-punched holes or teeth of any pattern for convenient field installation of any sheathing boards using nails or screws without drilling through the metal jacket at field required.

Example 2

A sheathing board, that is used in building construction, and that has pre-marked pattern at one or both faces that matches the pre-punched holes at composite studs as recited in example 1 for the purpose of locating nailing holes. The above pre-marked pattern can be of one or more of the following formats: factory drilled holes, printed marks or factory made indentations.

The sheathing material can be made of: plywood, gypsum board, oriented strand board (OSB), particle board, wood board, building board, or of any other existing and future building material, that is used as either interior or exterior sheathings.

Example 3

A building gravity system, made of the composite studs as recited in example 1, including: stud walls of typical building constructions that is made of, or partially made of, composite studs and posts, floor framing of typical constructions that is made of, or partially made of, composite joists and beams, roof framing of typical constructions that is made of, or partially made of, composite joists and beams, floor or roof trusses that is made of, or partially made of, composite studs, and composite posts that are used to support floor, deck, or roof gravity loads.

Example 4

A building lateral system, made of the composite studs as recited in example 1, including: shear walls that are made of, or partially made of, composite studs and posts, and have plywood or metal sheathing as described in examples 2, or composite sheathing board as described in example 6 on one or both faces, shear walls can be made of, or partially made of, composite studs and posts, and have with typical tension straps at one or both faces, and one or both directions, and a cantilever system with a composite post to resist lateral loads.

Example 5

Other structural system, made of the composite studs as in example 1, including: composite rods or studs that are used as poles and/or posts to support electric power lines, and/or telecommunication cable lines, composite rods or studs that are used as poles and/or posts support lights along street, composite rods or studs that are used as poles and/or posts to support flags, banners, or traffic signs, composite rods or studs that are used as fence posts, and composite rods or studs that are used in space trusses, like power transmission towers, wind turbine supporting structures, construction scaffold, and stage truss segments.

Example 6

Laminated composite sheathing, as shown in FIGS. 22, 23 and 24, comprising, typical structural plywood, or oriented strand board (OSB), or particle board, typical dimension 4 ft×8 ft, one or two light-gauged metal sheet of the same dimension as the plywood. In the metal sheet, there are pre-punched teeth which bite into the wooden board from one face or both faces, forming a whole piece of laminated board, or sandwich board. Optionally, there are additional pre-drilled circular holes on the metal sheet. These holes follow certain pattern to allow convenient nailing at field without additional drilling.

In summary, a composite member having a wooden core and a metal jacket with enhanced structural performance has been disclosed. The disclosure herein is intended to be illustrative, but not limiting, of the scope of the invention, which is set forth in the following claims.

What is claimed is:

1. A light-gauge, composite two-way lateral interaction structural member to provide support to a light-framed structure that exceeds a sum of individual component support, the composite member comprising:
    a dilating component comprising a wooden core of the composite member having a perimeter and a length, the wooden core providing support to the structure at a first magnitude, wherein the wooden core dilates and fails when subjected to a load above the first magnitude; and
    a confining component comprising a light-gauge metal jacket, wherein the confining component is formed by tightly wrapping the light-gauge metal jacket to a pre-stressed tension in a circumferential direction around the entire perimeter of the wooden core of the composite member and spanning the entire length, the metal jacket providing support to the structure at a second magnitude, wherein the metal jacket buckles and fails when subjected to a load above the second magnitude,
    wherein the pre-stressed tension of the metal jacket coupled with the wooden core provides a two-way lateral interaction normal to the interface between the metal jacket and the wooden core, that provides an amount of support to the structure surpassing the sum of amount of support provided by the metal jacket and the wooden core when being used separately, such that the first magnitude of the wooden core is increased by confinement of the metal jacket, and wherein the second magnitude of the metal jacket is increased by dilation of the wooden core,
    wherein a groove is slotted along the length of the wooden core, and a self-engaging clasp along the length of the metal jacket fitting within the wooden core groove to form a seal and a smooth surface when engaged, the self-engaging clasp configured to anchor opposite longitudinal edges of the metal jacket into the wooden core groove in order to develop and maintain the circumferential pre-stress, and
    wherein the metal jacket further comprises a pattern of pre-punched teeth configured to bind and anchor the metal jacket to the wooden core in order to develop and maintain the circumferential pre-stress.

2. The composite member of claim 1, wherein the wooden core is composed of at least one of: a solid nature wood and an engineered wood.

3. The composite member of claim 1, wherein the metal jacket is composed of at least one of: a light-gauged cold-formed steel sheet, a stainless steel sheet, an aluminum sheet, a copper sheet, and an alloy sheet.

4. The composite member of claim 1, wherein a cross-section of the wooden core is shaped to one of: a square, a rectangle, and a circle.

5. The composite member of claim 1, wherein the metal jacket provides lateral confinement for the wooden core to increase compressive strength and ductility of the wooden core.

6. The composite member of claim 1, wherein the wooden core provides lateral support for the metal jacket to prevent pre-mature local buckling failure of the jacket.

7. The composite member of claim 1, wherein additional amount of support is achieved through the interaction between the wooden core and metal jacket to enhance the overall strength and ductility of the composite member to a level that is much higher than the sum those of wooden core and metal jacket when used alone.

8. The composite member of claim 1, wherein the metal jacket and the wooden core provide support for vertical deflection when used as a joist or beam.

9. The composite member of claim 1, wherein the metal jacket and wooden core provide support for axial displacement when used as a post or column.

10. The composite member of claim 1, wherein the composite member is part of a lateral bracing system, and wherein the metal jacket and the wooden core provide support for lateral force when used as a stud or post in shear walls of the lateral bracing system.

11. The composite member of claim 1, wherein the composite member is part of a building gravity system that comprises at least one of: a stud wall, a floor frame, a roof frame, a floor truss, and a roof truss.

12. A method for providing a light-gauge, composite two-way lateral interaction structural member to provide support to a light-framed structure that exceeds a sum of individual component support, the method comprising:
    providing a dilating component comprising a wooden core of the composite member having a perimeter and a length, the wooden core providing support to the structure at a first magnitude, wherein the wooden core dilates and fails when subjected to a load above the first magnitude; and
    providing a confining component comprising a light-gauge metal jacket, wherein the confining component is formed by tightly wrapping the light-gauge metal jacket to a pre-stressed tension in a circumferential direction around the entire perimeter of the wooden core of the composite member and spanning the entire length, the metal jacket providing support to the structure at a second magnitude, wherein the metal jacket buckles and fails when subjected to a load above the second magnitude, wherein the pre-stressed tension of the metal jacket coupled with the wooden core provides a two-way lateral interaction normal to the interface between the metal jacket and the wooden core, that provides an amount of support to the structure surpassing the sum of amount of support provided by the metal jacket and the wooden core when being used separately, such that the first magnitude of the wooden core is increased by confinement of the metal jacket, and wherein the second magnitude of the metal jacket is increased by dilation of the wooden core, wherein a groove is slotted along the length of the wooden core, and a self-engaging clasp along the length of the metal jacket fitting within the wooden core groove to form a seal and a smooth surface when engaged, the self-engaging clasp configured to anchor opposite longitudinal edges of the metal jacket into the wooden core groove in order to develop and maintain the circumferential pre-stress, and wherein the metal jacket further comprises a pattern of pre-punched teeth configured to bind and anchor the metal jacket to the wooden core in order to develop and maintain the circumferential pre-stress.

\* \* \* \* \*